US010236750B2

(12) United States Patent
Hirotani et al.

(10) Patent No.: US 10,236,750 B2
(45) Date of Patent: Mar. 19, 2019

(54) ROTATING ELECTRIC MACHINE WITH A BUILT-IN CONTROL DEVICE AND ELECTRIC POWER ASSIST STEERING SYSTEM

(71) Applicant: MITSUBISHI ELECTRIC CORPORATION, Chiyoda-ku (JP)

(72) Inventors: Yu Hirotani, Chiyoda-ku (JP); Masatsugu Nakano, Chiyoda-ku (JP); Hiroyuki Waku, Chiyoda-ku (JP); Hiroyuki Akita, Chiyoda-ku (JP); Koji Kise, Chiyoda-ku (JP); Hiroyasu Iwabuki, Chiyoda-ku (JP); Kosuke Nakano, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 442 days.

(21) Appl. No.: 15/116,379

(22) PCT Filed: Nov. 18, 2014

(86) PCT No.: PCT/JP2014/080456
§ 371 (c)(1),
(2) Date: Aug. 3, 2016

(87) PCT Pub. No.: WO2015/122069
PCT Pub. Date: Aug. 20, 2015

(65) Prior Publication Data

US 2017/0008554 A1 Jan. 12, 2017

(30) Foreign Application Priority Data

Feb. 14, 2014 (JP) ................................ 2014-026072

(51) Int. Cl.
*H02K 11/33* (2016.01)
*B62D 5/04* (2006.01)
(Continued)

(52) U.S. Cl.
CPC .......... *H02K 11/02* (2013.01); *B62D 5/0406* (2013.01); *B62D 5/046* (2013.01); *H02K 9/22* (2013.01);
(Continued)

(58) Field of Classification Search
CPC ...... H02K 11/33; H02K 11/02; H02K 11/215; H02K 11/022; H02K 11/024; H02K 5/24;
(Continued)

(56) References Cited

U.S. PATENT DOCUMENTS 9,473,004 B2 * 10/2016 Kadoike ............... H02K 11/33
2004/0062664 A1 4/2004 Weigold et al.
(Continued)

FOREIGN PATENT DOCUMENTS

CN 102223121 A 10/2011
JP 7-312493 A 11/1995
(Continued)

OTHER PUBLICATIONS

Office Action dated Jan. 10, 2017 in Japanese Patent Application No. 2015-562695 (with English translation).
(Continued)

*Primary Examiner* — Joseph M Rocca
*Assistant Examiner* — Daniel S Yeagley
(74) *Attorney, Agent, or Firm* — Oblon, McClelland, Maier & Neustadt, L.L.P.

(57) ABSTRACT

A rotating electric machine with a built-in control device that can be downsized. The rotating electric machine with a built-in control device includes a rotor including a permanent magnet of sensor use provided on a rear side of a rotor shaft, a front side housing fixed with a first bearing supporting a front side of the rotor shaft, a motor frame including a rotor and a stator, a heat sink fixed with a second bearing supporting the rear side of the rotor shaft, a control substrate
(Continued)

10
5
4
22a 20 18 15a 11b 3a 21 12 19 17a 17b 23 24 11a 16b 14 16a 16c 3b 22b 15b 3c 17c 26a 26b 13 mounting a rotary sensor, a microcomputer, and a driving circuit. The microcomputer controls the driving circuit based on signals from the rotary sensor and drives a plurality of switching elements. At least one of a smoothing condenser and a noise reduction coil, connected to the switching elements, is arranged at a far rear side of the control substrate.

16 Claims, 28 Drawing Sheets

(51) Int. Cl.
*H02K 11/02* (2016.01)
*H02K 11/215* (2016.01)
*H02K 9/22* (2006.01)
*H02K 11/22* (2016.01)

(52) U.S. Cl.
CPC ......... *H02K 11/022* (2013.01); *H02K 11/024* (2013.01); *H02K 11/215* (2016.01); *H02K 11/33* (2016.01)

(58) Field of Classification Search
CPC ........ H02K 9/22; H05K 7/1432; H01L 23/36; B62D 5/0406; B62D 5/046
See application file for complete search history.

(56) References Cited

U.S. PATENT DOCUMENTS

2008/0211332 A1 9/2008 Kataoka et al.
2011/0006634 A1 1/2011 Nomura et al.
2011/0018374 A1* 1/2011 Yamasaki ............... H01L 23/36 310/64
2011/0254387 A1 10/2011 Matsuda et al.
2011/0254393 A1 10/2011 Yamasaki et al.
2012/0098361 A1 4/2012 Yamasaki et al.
2012/0098365 A1 4/2012 Yamasaki et al.
2012/0098366 A1 4/2012 Yamasaki et al.
2012/0098391 A1 4/2012 Yamasaki et al.
2012/0104886 A1* 5/2012 Yamasaki ............ B62D 5/0406 310/71
2012/0229005 A1 9/2012 Tominaga et al.
2012/0273292 A1* 11/2012 Sekine ................. B62D 5/0406 180/444
2013/0088128 A1* 4/2013 Nakano ................ B62D 5/0406 310/68 R
2013/0187517 A1 6/2013 Asao et al.
2013/0249356 A1* 9/2013 Nakano .................... H02K 5/24 310/68 D
2014/0153198 A1* 6/2014 Yamasaki ............ H05K 7/1432 361/747
2014/0300304 A1 10/2014 Omae et al.
2014/0326530 A1 11/2014 Asao et al.

FOREIGN PATENT DOCUMENTS

JP 2002-345211 A 11/2002
JP 2003-199295 A 7/2003
JP 2003-299317 A 10/2003
JP 2003-324914 A 11/2003
JP 2004-512462 A 4/2004
JP 2008-174097 A 7/2008
JP 2008-219994 A 9/2008
JP 2011-19356 A 1/2011
JP 2011-176998 A 9/2011
JP 2011-200022 A 10/2011
JP 2011-229227 A 11/2011
JP 2011-229229 A 11/2011
JP 2013-153580 A 8/2013
JP 5414869 B1 11/2013
JP 2014-43122 A 3/2014
JP 2014-75866 A 4/2014
WO 2013/111365 A1 8/2013
WO 2013/132584 A1 9/2013

OTHER PUBLICATIONS

Combined Office Action and Search Report dated Nov. 30, 2017 in Chinese patent Application No. 201480075308.0 (with English machine translation and English translation of category of cited documents), 12 pages.
International Search Report dated Feb. 10, 2015 in PCT/JP214/080456 Filed Nov. 18, 2014.

* cited by examiner 100
1a
1b
1c
2
9
9
8
8
6
Shift Directions of
Rack Shaft
15
16
3a
3b
3c
7a
7
5
4
10

16b
16d
16d 16b
16d
16d 16b
16d
16d 11
30
U相
12c
19
30a
30b
3a
31
12a
12b
12
12d
13
15b
W相
12c
12
19
FET
Driving
Circuit
Micro-
computer
U
W
V
12a
12b
12d
13b
13a
24
12c
Rotary
Sensor
19
12a
V相
12b
12d
12
3b
Torque Signal
3c
Automobile
Information 10
20
21
15a
25
17b
14
25

ROTATING ELECTRIC MACHINE WITH A BUILT-IN CONTROL DEVICE AND ELECTRIC POWER ASSIST STEERING SYSTEM

TECHNICAL FIELD

The present invention relates to a rotating electric machine with a built-in control device and an electric power assist steering system, and more particularly to the downsizing of the rotating electric machine with a built-in control device.

BACKGROUND

An electric power assist steering system for a wheeled vehicle includes a rotating electric machine which is combined together with a control device (See Patent Documents 1-15, for reference). Usually, the control device is arranged on an anti-output shaft side of the rotating electric machine (See Patent Document 1, for reference). In the control device, there is provided a power module for supplying driving current and a heat sink for absorbing heat generated by the power module. The power module and the heat sink are disposed on the outside of a case of the rotating electric machine. The heat sink is connected with the surrounding portion of the case of the rotating electric machine by way of an intermediate member, where the heat sink is within the case in outer diameter. On a motor frame, there is mounted a bearing which supports the anti-output shaft side of the rotating electric machine.

As in a rotating electric machine which is combined with a control device, a control substrate and a heat sink are arranged in the control device (See Patent Document 2, for reference). A rotary sensor for detecting a rotational angle of a rotor is disposed along a shaft direction and faces a permanent magnet of sensor use. The permanent magnet of sensor use is held at the end portion of the anti-output shaft side of the rotating electric machine. The heat sink is in contact with the switching elements of a drive circuit for the rotating electric machine. A bearing of the anti-output shaft side is arranged on the heat sink. The small-sizing of a shaft length and the reduction in the number of components are considered.

In the configuration mentioned above, a bearing of the anti-output shaft side is arranged in a heat sink. Efforts are made to contract the length of a shaft and to reduce the number of components. Noise reduction coils, condensers and others are arranged between the heat sink and the control substrate. Thereby, the distance from the bearing of the anti-output shaft side to the control substrate is large. The rotating electric machine may be increased in size and weight, when the rotating electric machine is large in shaft length. Further, the noise reduction coils, the condensers and others are arranged on a heat sink, in such a way that they are embedded in the heat sink. Accordingly, the volume of the heat sink is reduced and the heat capacity of the heat sink is decreased. Moreover, the distance between the heat sink and the control substrate becomes large, when the heat sink is in contact with the switching elements of the control substrate and absorbs heat produced. Accordingly, a protrusion portion becomes large in length and the electric rotation machine may have increased size and weight.

CITATION LIST

Patent Literature

Patent Document 1: JP2011-229227 A
Patent Document 2: JP2011-200022 A
Patent Document 3: JP2002-345211 A
Patent Document 4: JP2008-174097 A
Patent Document 5: JP2004-512462 W
Patent Document 6: WO2013/132584 A
Patent Document 7: WO2013/111365 A
Patent Document 8: JP2013-153580A
Patent Document 9: JP2008-219994 A
Patent Document 10: JP2003-199295 A
Patent Document 11: JPH07-312493 A
Patent Document 12: JP2003-299317 A
Patent Document 13: JP2003-324914 A
Patent Document 14: JP2014-043122 A
Patent Document 15: JP2014-075866 A

SUMMARY OF THE INVENTION

Technical Problem

The present invention has been directed to overcome the above mentioned disadvantages, and an object of the present invention is, in a rotating electric machine with a built-in control device, to reduce the size of the machine.

Solution to Problem

A rotating electric machine with a built-in control device, according to the present invention, includes; a rotor having a permanent magnet of sensor use, the magnet attached to a rear side of a rotor shaft; a stator having a stator core and an armature winding; a front side housing having a first bearing, the bearing fixed to the housing and supporting a front side of the rotor shaft; a motor frame containing the rotor and the stator, the frame coupled with the front side housing; a heat sink having a second bearing and mounting a plurality of switching elements, the bearing fixed to the heat sink and supporting the rear side of the rotor shaft; a control substrate arranged at a position far rear side of the heat sink, and having a rotary sensor, a microcomputer and a driving circuit mounted thereon; a smoothing condenser connected to the plurality of switching elements, and a noise reduction coil connected to the plurality of switching elements, wherein the rotary sensor faces with the permanent magnet of sensor use, the microcomputer controls the driving circuit based on a signal from the rotary sensor and drives the plurality of switching elements, and at least one of the smoothing condenser and the noise reduction coil is arranged at a position far rear side of the control substrate.

Advantageous Effects of Invention

According to the present invention, the heat sink doubles as a housing of the rear side. Thereby, the decrease of component number, the reduction in cost, the shortening of the size towards a shaft direction can be achieved.

DESCRIPTION OF EMBODIMENTS

Figure 1:
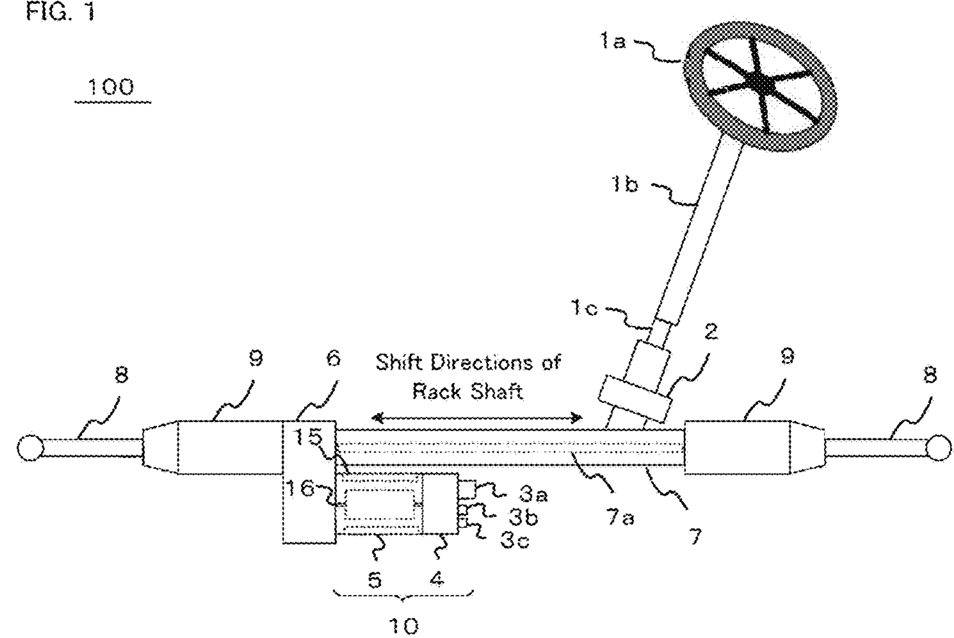
FIG. 1 is a schematic view of an electric power assist steering system.

Hereinafter, the explanation will be made in more detail referring to the drawings for the embodiments of a rotating electric machine with a built-in control device and an electric power assist steering system according to the present invention. Note that, the present invention is not limited to those statements described below, and can appropriately be modified within the scope not departing from the gist of the invention. In the drawings, those constituent elements to which the same reference numerals and symbols are given designate the same or corresponding constituent elements.

Embodiment 1.

FIG. 1 is an explanatory drawing of the electric power assist steering system 100 for an automobile, in accordance with the embodiments of the present invention. A control device 4 and a motor unit 5 are combined together to build a rotating electric machine 10. Electric power from a battery or an alternator is supplied, by way of a connector 3*a*, to the control device 4 of the rotating electric machine 10. The motor unit 5 of the rotating electric machine 10 includes a stator 15 and a rotor 16. When a driver turns a steering wheel 1*a*, torque is transmitted, by way of a steering shaft 1*b*, to a shaft 1*c*. A torque sensor 2 detects the torque (a torque signal) and converts it into an electric signal. The electric signal is transmitted, by way of a connector 3*b*, to the control device 4 of the rotating electric machine 10. On the other hand, automobile information like car speed and others is converted into electric signals and is transmitted, by way of a connector 3*c*, to the control device 4 of the rotating electric machine 10.

The rotating electric machine 10 is arranged along a direction parallel to the shift directions of a rack shaft (See the direction of an arrow shown in the figure). The control device 4 calculates a necessary assist torque from the torque signal and the automobile information and supplies electric current to the motor unit 5. The torque, which is generated by the rotating electric machine 10, is lowered in speed by a gear box 6 which contains a belt and a ball screw, and produces thrust forces for moving a rack shaft 7*a* disposed inside a rack housing 7, towards a direction indicated by the arrow. Accordingly, a tie rod 8 moves and tires are changed in direction to make the vehicle turn around. The tie rod is a rod or bar which connects a steering gear box with a steering knuckle arm of the vehicle, for turning steering tires (front tires in many cases) to the right or to the left, according to the movement of a steering wheel. The rotating electric machine 10 generates torque for assisting a steering force and a driver can turn the vehicle with a reduced steering force. A rack boot 9 is installed to prevent foreign matters from getting into the system.

Figure 2:
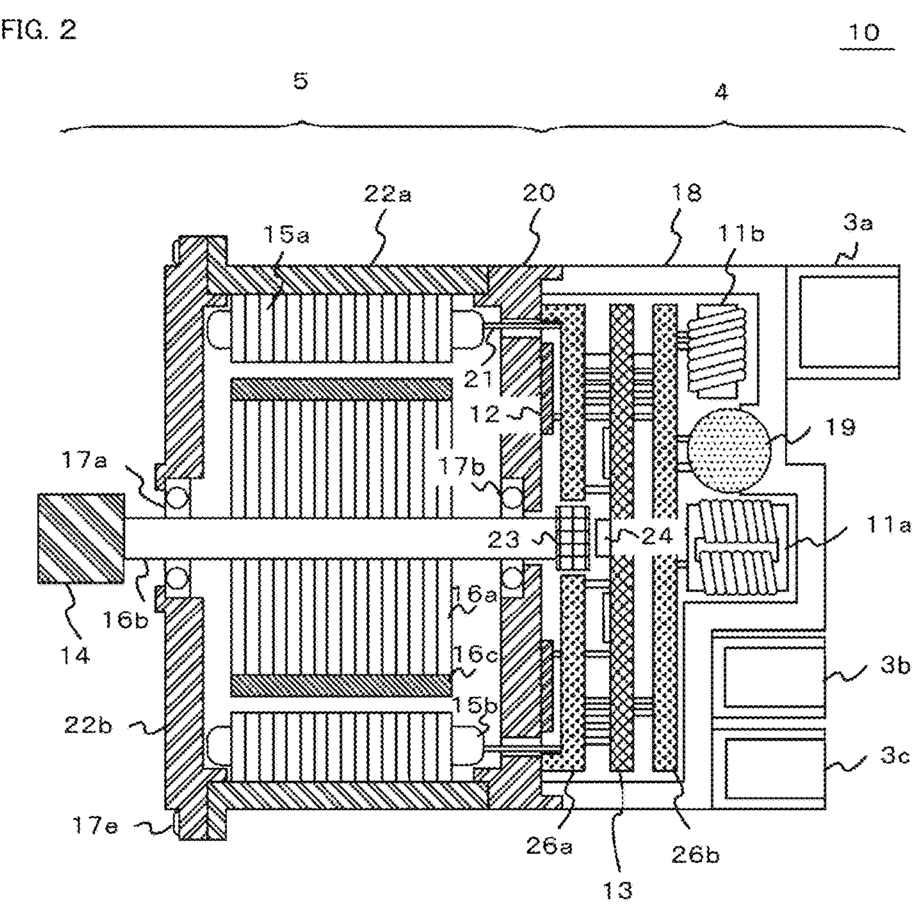
FIG. 2 is a schematic view of a rotating electric machine in accordance with Embodiment 1.

Referring to FIG. 2, explanation is made in detail about a structure of a rotating electric machine in accordance with Embodiment 1 of the present invention. The rotating electric machine 10 has an integrated structure in which a control device 4 and a motor unit 5 are combined together. A pulley 14 and a permanent magnet of sensor use 23 are attached to a rotor shaft 16*b* of the rotating electric machine 10. Hereafter, as far as the rotor shaft 16*b* of the rotating electric machine 10 is concerned, one end of the rotor shaft 16*b* attached with the pulley 14 is referred to as a front side of the rotating electric machine 10. Further, the other end of the rotor shaft 16*b* attached with the permanent magnet of sensor use 23 is referred to as a rear side (or an anti-output shaft side) of the rotating electric machine 10. The control device 4 is arranged on the rear side (or on the anti-output shaft side) of the rotating electric machine 10. The rotating electric machine 10 and the control device 4 are roughly circular, when they are viewed from a shaft direction.

A stator 15 of the rotating electric machine 10 is composed of, a stator core 15*a* which is made up of laminated magnetic steel sheets, and an armature winding 15*b* which is stored in the stator core 15*a*. The stator core 15*a* is fixed with a motor frame 22*a*. A front side housing 22*b* is arranged on a front portion of the rotating electric machine 10. The motor frame 22*a* and the front side housing 22*b* are fixed with bolts 27*e*. A bearing 17*a* on the front side (a first bearing) is provided on the front side housing 22*b*. The bearing 17*a* on a front side and the bearing 17*b* on a rear side (a second bearing) both hold a rotor shaft 16*b* in a rotatable manner.

The teeth of the stator core 15*a* are wound around, by way of an insulator, with armature windings 15*b* of three phrase (U phase, V phase and W phase) connections. Each of the armature windings is connected mutually to form a three phase connection. Each terminal of the three phase connection is connected respectively to three motor terminals 21 in a total number. Some motor terminals are in the form of conductors electrically connected to the armature windings of the motor and others are in the form of connection plate terminals electrically connected to the armature winding of the motor. Currents for energizing the rotating electric machine 10 flow through the armature winding 15*b*. Thereby, heat is generated in the armature winding 15*b*. Accordingly, the motor frame 22*a* and others provide a structure for heat releasing and cooling. The rotating electric machine 10 may adopt a structure in which a permanent magnet is embedded in the rotor core 16*a*, or may employ an induction machine or a reluctance motor, which doesn't use a permanent magnet.

The rotor 16 of the rotating electric machine 10 consists of a rotor core 16*a*, a rotor shaft 16*b*, a permanent magnet 16*c* and the like. The rotor core 16*a* is press fitted into the rotor shaft 16*b*. The permanent magnet 16*c* is fixed on the surface of the rotor core 16*a*. On the rear side end portion of the rotor shaft 16*b*, directly attached is a permanent magnet of sensor use 23. The permanent magnet of sensor use 23 protrudes from the heat sink 20 towards the rear side. The rotor shaft 16*b* is reduced in length of the shaft direction and then, the permanent magnet of sensor use 23 can produce an eccentric error to the rotary sensor 24 in a lesser extent. The permanent magnet of sensor use 23 generates magnetic fluxes on the rear side. A non-magnetic holder may preferably be arranged between the rotor shaft 16*b* and the permanent magnet of sensor use 23, in order to reduce the leakage magnetic flux generated in the rear side of the permanent magnet of sensor use.

A drive circuit for the rotating electric machine, which includes switching elements 12, is mounted on the control device 4, in order to drive the rotating electric machine 10. The switching elements 12 include MOS-FETs (Metal Oxide Semiconductor Field Effect Transistors) and the like. On the control device 4, there are provided a connector 3*a* for power supplying use, a connector 3*b* for receiving a signal (a torque signal) from a torque sensor 2, and a connector 3*c* for receiving automobile information like car speed and others. The control device 4 comprises a control substrate 13, a control device case 18, a circuit wiring member 26*a* (a second circuit wiring member or No. 2 circuit wiring member) and a circuit wiring member 26*b* (a first wiring member or No. 1 circuit wiring member). The circuit wiring member 26*a* is arranged at a position far rear side of the heat sink 20 and, in addition, at a position far front side of the control substrate 13. The circuit wiring member 26*b* is arranged at a position far rear side of the control substrate 13. The control substrate 13, which has low current components mounted thereon, is arranged along a face perpendicular to the rotor shaft 16*b* of the rotating electric machine 10.

On the control device 4, arranged are a smoothing condenser 19, a common mode coil 11*a*, a normal mode coil 11*b* and others, besides the switching element 12. The common mode coil 11*a* and the normal mode coil 11*b* are provided for reducing noises and arranged at a position far rear side of the control substrate 13. Likewise, the smoothing condenser 19, which is provided for smoothing currents, is arranged at a position far rear side of the control substrate 13. The control device 4 is covered with a control device case 18. The control device case 18 may be made of plastic, metal like aluminum or a combination of plastic and metal like aluminum. The control device case 18 provides a structure where the case is in contact with the smoothing condenser 19. The structure preforms heat radiation and cooling of the case. The smoothing condenser 19, the common mode coil 11*a* and the normal mode coil 11*b* are electrically connected together with a bus bar. The noise reduction coils 11 and the smoothing condenser 19 are supposed to be arranged at a position far rear side of the control substrate 13. Similar effects are produced, in a case where at least one of noise reduction coils 11 and a smoothing condenser 19 is arranged at a position far rear side of the control substrate 13.

As mentioned above, because at least one of the noise reduction coils 11 and the smoothing condenser 19 is arranged at a position far rear side of the control substrate 13, it is possible to prevent at least one of the noise reduction coils 11 and the smoothing condenser 19 from being arranged inside of the heat sink. Accordingly, the heat sink secures a volume per shaft length. In addition, the heat sink can have improved heat capacity, while the size of the heat sink becomes smaller in a shaft direction. Further, because at least one of the noise reduction coils 11 and the smoothing condenser 19 fails to be arranged between the bearing 17*b* on the rear side and the control substrate 13, the distance between the bearing 17*b* on the rear side and the control substrate 13 becomes smaller. In consequence, the size of the rotating electric machine 10 may be reduced and, moreover, the rotating electric machine 10 can become lighter in weight.

The smoothing condenser 19 achieves heat radiation and cooling, by putting the surrounding of the condenser, in direct contact or in indirect contact through a plastic and the like, with the control device case 18. Accordingly, the rise in temperature of the smoothing condenser 19 is under restraint and the reliability of the smoothing condenser 19 improves. Further, a space is provided between the end plane of the smoothing condenser 19 and the control device case 18. When the inner pressure of the smoothing condenser 19 is increased, the control device case 18 doesn't make an obstacle. The body of the smoothing condenser 19 can swell out and thereby an effect is produced that the inner pressure of the smoothing condenser is lowered. It is not necessary to put the smoothing condenser 19 and the control device case 18 in contact with together.

Figures 3A, 3B, 3C:
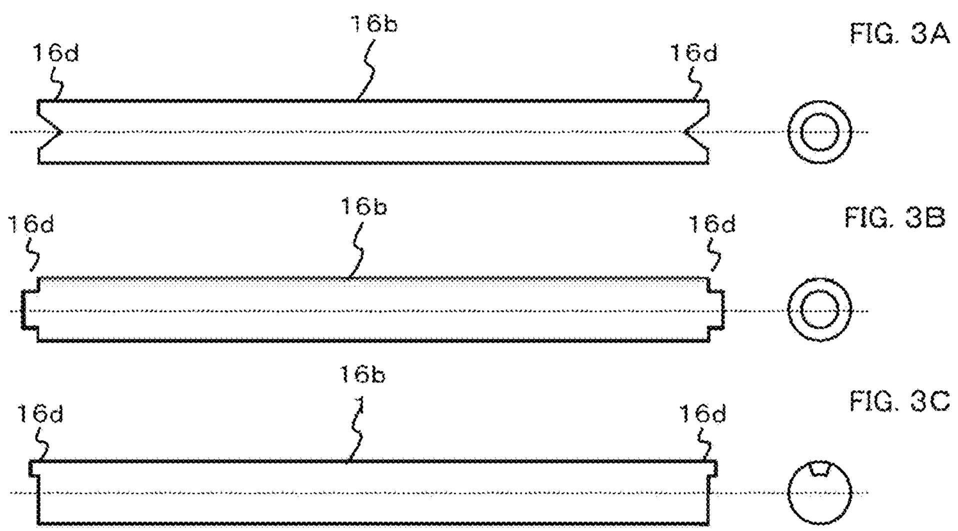
FIG. 3A is a schematic view for showing a first example of a shaft holding portion.
FIG. 3B is a schematic view for showing a second example of the shaft holding portion.
FIG. 3C is a schematic view for showing a third example of the shaft holding portion.

In reference to FIG. 3A to FIG. 3C, explanation is given on the structure of a rotor shaft 16*b* of the rotating electric machine 10. A shaft holding portion 16*d* is arranged on the both ends of the rotor shaft 16*b* and the configuration is provided in that the rotor shaft 16*b* can be fixed from the both ends. As shown in FIG. 3A, the shaft holding portion 16*b*, for an example, represents a groove portion concentrically arranged on the shaft and provided on the center portion of the shaft. By taking the configuration mentioned above, the shaft can be fixed from the both sides, at the time of assembling the shaft. It is also made possible that a rotor and a stator avoid making in contact with together, when the rotor and the stator are assembled. Further, as shown in FIG. 3B, the shaft holding portion represents a shaft protrusion portion concentrically arranged on the shaft and provided on the center portion of the shaft. Furthermore, the shaft holding portion can be a cutting portion provided partially on a shaft end, as shown in FIG. 3C. In any of these cases, similar effects are produced. A pulley 14 is press fitted into one of the end portions of the rotor shaft 16*b*, that is to say, the front side of the shaft. The pulley 14 transmits driving power to the belt of the electric power assist steering system.

Figure 4:
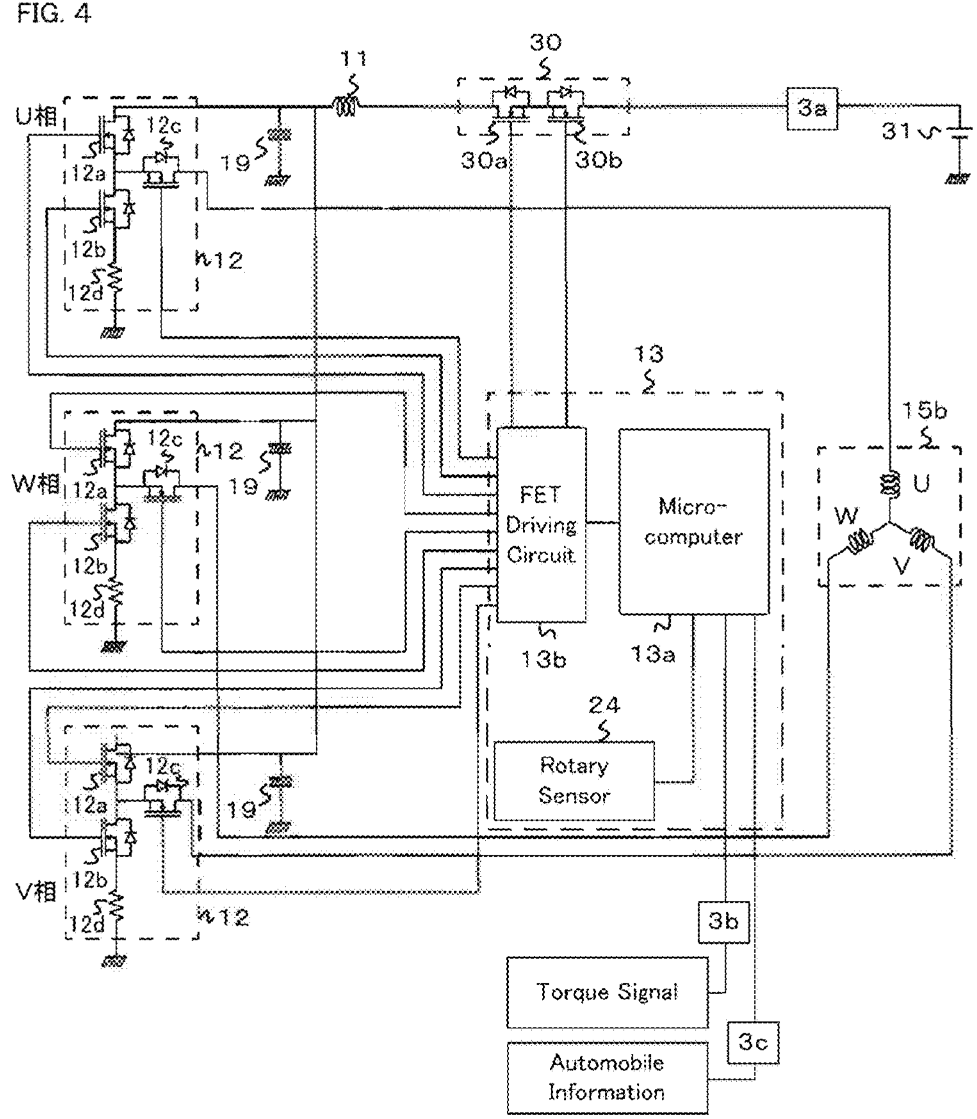
FIG. 4 is a schematic drawing for showing a schematic circuit diagram of the control device.

FIG. 4 shows an example of the circuit diagram in a control device. On the control device 4, provided are a connector 3A for supplying electric power, a connector 3B for receiving a torque signal from the torque sensor 2, and a connector 3C for receiving automobile information like car speed and others. An armature winding 15*b* of the rotor 15 is in Y connection. Three switching elements 12 are provided, to correspond to each phase of the three phase connection. Each of the switching elements 12 includes a MOS-FET 12*a*, a MOS-FET 12*b*, a MOS-FET 12*c* and a shunt resistor 12*d*, mounted thereon. In the U phase of the three phase bridge circuit, the MOS-FET 12*a* constitutes a U phase plus side arm and the MOS-FET 12*b* constitutes a U phase minus side arm. One end of the MOS-FET 12*a* is connected to a smoothing condenser 19 for current smoothing and a noise reduction coil 11 (especially to a normal mode coil). One end of the MOS-FET 12*b* is connected to an earth grounding portion of the vehicle by way of the shunt resistor 12*d*. A connection point of the MOS-FET 12*a* and the MOS-FET 12*b* denotes a U phase AC side terminal of the three phase bridge circuit. One end of the MOS-FET 12*c* is connected with the U phase AC side terminal and the other end of the MOS-FET 12*c* is connected with a U phase terminal of the armature winding 15*b*. The switching element 12 of W phase and the switching element 12 of V phase are constructed in a similar manner respectively.

A MOS-FET 30*a* and a MOS-FET 30*b* are mounted in a power relay 30 and each one end of the transistors is connected together. The other end of the MOS-FET 30*a* is connected to the plus side DC terminal of the three phase bridge circuit by way of the noise reduction coil 11. The other end of the MOS-FET 30*b* is connected to a battery 31 installed in a vehicle by way of a connector 3*a*. A FET driving circuit 13*b* is mounted on the control substrate 13 and the output terminals of the driving circuit are connected to the gates of the MOS-FETs 12*a*-12*c*. The FET driving circuit 13*b* gives those respective gates of the transistors a gate driving signal at a predetermined respective timing. A microcomputer 13*a* is mounted on a control substrate 13 and torque signals and the automobile information are transmitted to the microcomputer by way of the connector 3*b* and the connector 3*c*, respectively. The microcomputer 13*a* controls the output timing of the gate driving signals which are outputted by the FET driving circuit 13*b* on the basis of the rotational detection signals from a rotary sensor 24. Various condensers and coils are mounted on the control device. Among those coils, a common mode coil 11*a* or a normal mode coil 11*b* is the first largest or the second largest, respectively. In addition, among those condensers, a smoothing condenser is primary largest. The smoothing condensers 19 are arranged for smoothing currents and have a largest capacity among the condensers. It is obvious that the smoothing condensers may be arranged in a plural number (three, for example).

Figure 5A:
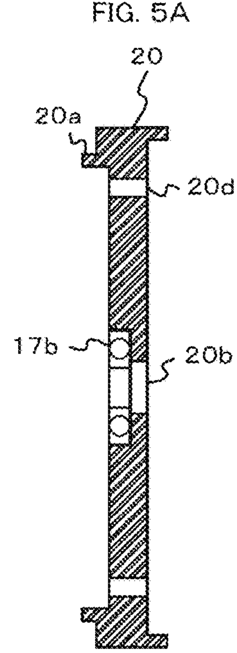
FIG. 5A is a sectional drawing for showing a heat sink and FIG. 5B is a top view for showing the heat sink.
Figure 5B:
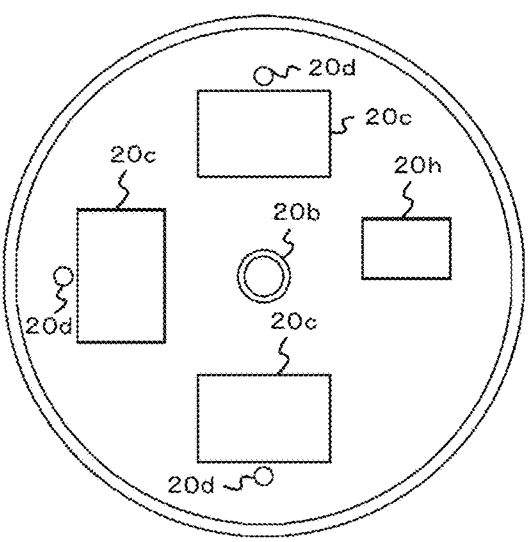

In reference to FIG. 5A and FIG. 5B, explanation is made about a heat sink. As shown in FIG. 5A, the heat sink 20 is provided with a heat sink protrusion portion 20*a* which is assigned for fitting with a motor frame 22*a*. By providing a heat sink 20 with a heat sink protrusion portion 20*a*, the heat resistance between the heat sink 20 and the motor frame 22*a* is reduced. The heat sink 20 can transmit more heat of the sink to the motor frame 22*a*. Then, the heat sink 20 can have improved heat capacity and cooling performance of the switching element 12 is improved. Further, when the same metal material is employed in the heat sink 20 and the motor frame 22*a*, both members have the same thermal expansion coefficient. The fixing strength between the motor frame 22*a* and the heat sink 20 will improve, when the motor unit 5 changes in temperature. By employing aluminum or aluminum alloy to the heat sink 20 and the motor frame 22*a*, it is made possible that the motor frame 22*a* and the heat sink 20 have the reduction in weight and the increase in thermal conductivity.

The heat sink 20 is fixed with the motor frame 22*a*, by thermal inserting, press fitting or screwing, in use of the heat sink protrusion portion 20*a*. In the embodiment, the heat sink 20 is fixed with the motor frame 22*a* of the rotating electric machine 10, by thermal inserting. Heat of the heat sink 20 can be conducted to the motor frame 22*a* efficiently, by fixing the heat sink 20 with the motor frame 22*a*, as mentioned above. Especially by employing the thermal inserting or the press fitting, the thermal resistance between the heat sink 20 and the motor frame 22*a* decreases in a large extent and heat produced in the heat sink 20 is transmitted to the motor frame 22*a* in a larger quantity. The heat sink 20 is improved in heat capacity and thereby the cooling performance of the switching element 12 can be improved.

The heat sink 20 is almost in a circular form, when the heat sink is viewed from a shaft direction, in order to increase the volume of the heat sink. As shown in FIG. 5B, three switching element arrangement portions 20*c* and a switching element arrangement portion 20*h* are arranged on the rear side face of the heat sink 20. Further, there are also provided three electric wiring through holes 20*d* which penetrate the heat sink 20. The switching element arrangement portions 20*c* correspond respectively to the switching elements of the three phase connection. The switching element arrangement portion 20*h* corresponds to the power relay 30. Each of the three motor terminals 21 penetrates a corresponding electric wiring through hole 20*d*. Accordingly, each electric wiring through hole can be made as small as possible, and the heat sink can have a larger volume. Thereby, the heat capacity of the heat sink is improved and the switching elements have improved cooling performance.

The outer diameter of a permanent magnet of sensor use 23 is larger than a minimum portion of the shaft through hole 20*b* of the heat sink 20 in the outer diameter. Then, the shaft through hole 20*b* of the heat sink 20 can be made small. While the heat sink 20 is improved in heat capacity, a permanent magnet of sensor use 23 with a large outer diameter can be employed. The permanent magnet of sensor use 23 produces flatter magnetic fields and the rotary sensor 24 is improved in precision level. The permanent magnet of sensor use 23 protrudes from the heat sink 20 towards the rear side. Accordingly, a permanent magnet of sensor use, which has an outer diameter larger than the minimum portion of the shaft through hole 20*b* in outer diameter, is eliminated from the use on the inside the heat sink 20. The heat sink 20 can have an increased volume. Further, the heat sink can have improved heat capacity and the improved heat capacity will improve cooling performance of the switching elements 12. Furthermore, the distance between the permanent magnet of sensor use 23 and the control substrate 13 can be made smaller. Magnetic fields produced by the permanent magnet of sensor use 23 become flat and the rotary sensor 24 will be improved in precision level.

Figure 6A:
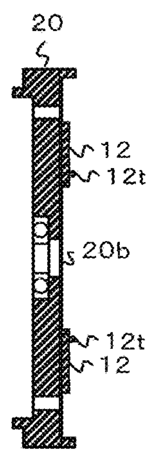
FIG. 6A is a sectional view for showing a constitution of switching elements.
Figure 6B:
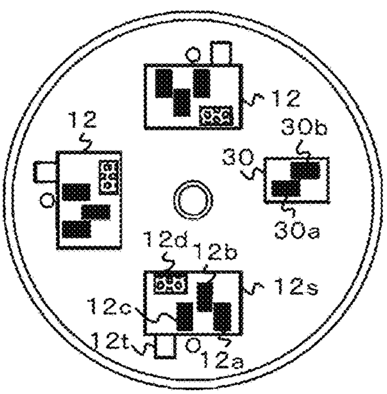
FIG. 6B is a top view for showing a first arrangement of the switching elements.
Figure 6C:
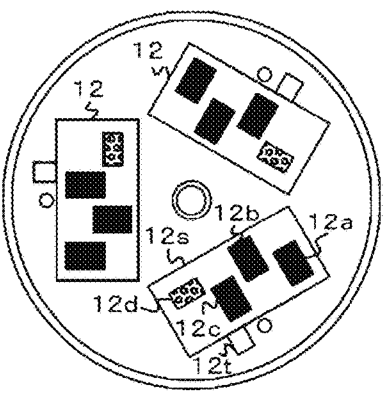
FIG. 6C is a top view for showing a second arrangement of the switching elements.

In reference to FIG. 6A to FIG. 6C, complimentary explanation is made about switching elements. The control device is equipped with a rotating electric machine driving circuit for driving the rotating electric machine. The rotating electric machine driving circuit has the switching elements 12 which include MOS-FETs and others. The switching elements 12 allow current for driving the rotating electric machine to flow through and, therefore, produce heat. In the embodiment, the switching elements are in contact with the switching element arrangement portions 20*c* of the heat sink 20 by way of an adhesive, an insulation sheet or the like. Thereby heat radiation for cooling is performed on the switching elements. In FIG. 6B, the switching elements 12, which are in contact with the heat sink 20, is in a structure where bear chips of the switching elements are mounted on DBC (Direct Bonded Copper) substrates 12*s*.

The switching elements 12 encircle a power relay 30 and are arranged on a circle with ca. 90 degree separation. Each of the MOS-FET 30*a* and the MOS-FET 30*b* has a bear chip on the power relay 30. The switching element 12 of three phase connection has a MOS-FET 12*a*, a MOS-FET 12*b*, a MOS-FET 12*c* and a shunt resistor 12*d*. A terminal 12*t* of the switching element is to be connected electrically with the end portions of three motor terminals, which connect through wiring from the rotating electric machine to the control device side, by welding, press fitting, soldering or the like. In the embodiment, one of the switching elements plays a role for disconnecting the rotating electric machine electrically on a necessary occasion, or that is to say, the role of a motor relay. The switching elements are in three phase connection here. The switching elements may be in a different phase connection, like in two phase connection, in five phase connection or in six phase connection. The number of the switching elements may be a number other than three. The terminal 12*t* of the switching element is supposed to be connected electrically with the end portions of three motor terminals, which are wired from the rotating electric machine to the control device side, by welding, press fitting or soldering. The terminal 12*t* of the switching element may be further connected electrically with a motor terminal by welding, press fitting, soldering or the like, while the terminal 12*t* is connected electrically with a circuit wiring member by welding, press fitting, soldering or the like.

In addition, FIG. 6C shows a case where a power relay is not provided on a control substrate. In a case when a power relay is not provided, the switching elements are arranged on a circle with ca. 120 degree separation. This arrangement secures a large area for the switching elements and can transfer heat produced in the switching elements effectively to switching element arrangement portions. Accordingly, an effect is produced that the increase of temperature in the switching elements is lowered. Further, in the drawing, connection portions like bonding wires and others for electrically connecting bear chips and shunt resistors 12*d* are not shown. The switching elements 12 of three phase connection are in common design and then, the rotating electric machine can be cost competitive.

Figure 7A:
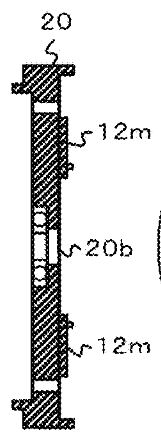
FIG. 7A is a first sectional view for showing a constitution of power modules.
Figure 7B:
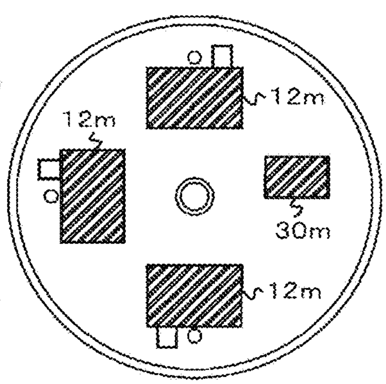
FIG. 7B is a top view for showing a first arrangement of the power modules.
Figure 7C:
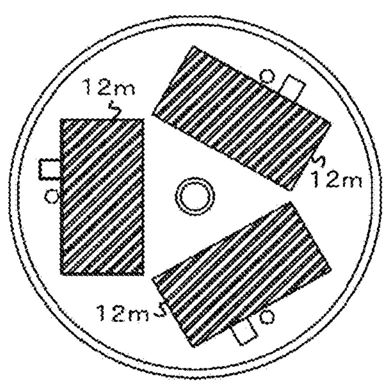
FIG. 7C is a top view for showing a second arrangement of the power modules.
Figure 7D:
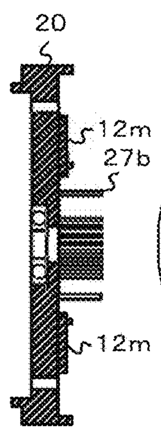
FIG. 7D is a second sectional view for showing the constitution of the power modules.
Figure 7E:
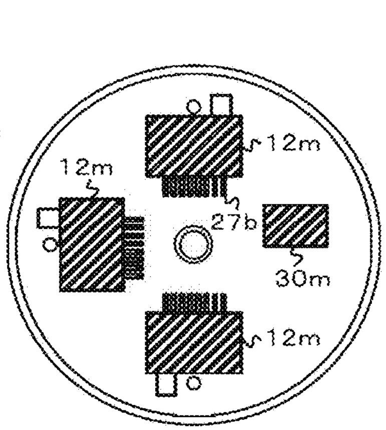
FIG. 7E is a top view for showing a third arrangement of the power modules.
Figure 7F:
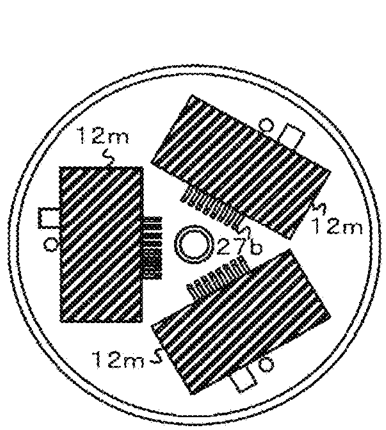
FIG. 7F is a top view for showing a fourth arrangement of the power modules.

In reference to FIG. 7A, FIG. 7B and FIG. 7C, supplemental explanation is made further about the switching elements. In the previous drawing, an embodiment takes the configuration in which a bear chip of the switching elements is mounted on a DBC substrate. The switching elements 12 may employ a power module, in which the bear chips of the switching elements are molded with plastic. By molding the bear chips of switching elements with plastic, heat produced in switching elements 12*m* can be transferred effectively to the switching element arrangement portions. Accordingly, an effect is produced that the increase in temperature of the switching elements is lowered. Further, as shown in FIG. 7D, FIG. 7E and FIG. 7F, circuit terminals 27*b* are allowed to be set up on the switching elements 12.

Figure 8A:
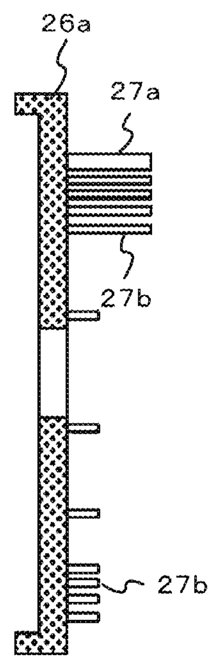
FIG. 8A is a sectional view for showing a second circuit wiring member.
Figure 8B:
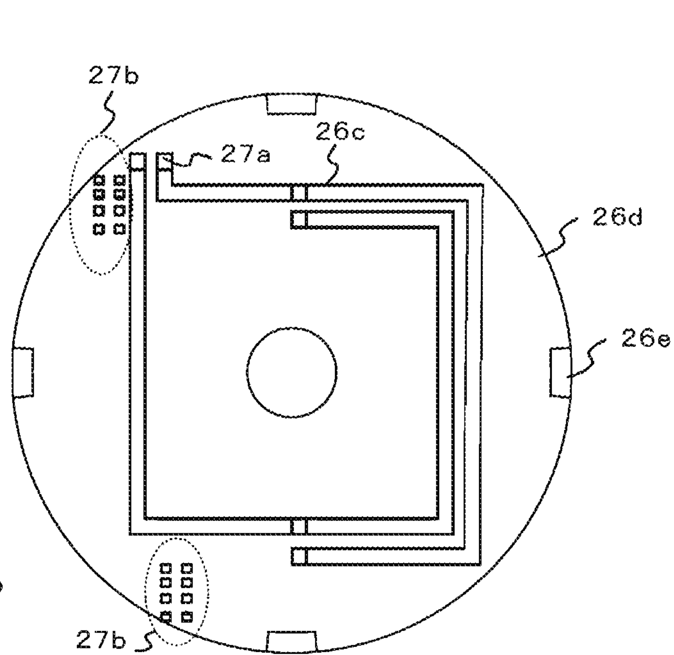
FIG. 8B is a top view for showing the second circuit wiring member.

FIG. 8A and FIG. 8B show an example of a circuit wiring member. The circuit wiring member 26 includes, a circuit wiring member 26*a* which are arranged on a rear side of the heat sink 20 and further a front side of the control substrate 13, and a circuit wiring member 26*b* which are arranged on a rear side of the control substrate 13. The circuit wiring member 26*a* is made up of a bus bar 26*c*, a frame 26*d*, a positioning portion 26*e*, a power terminal 27*a*, a circuit terminal 27*b* and others. The frame 26*d* is made of an insulation material like plastic, and holds the bus bar 26*c* and others. The frame 26*d* may be integral molded with the bus bar 26*c*. The bus bar 26*c* of the circuit wiring member 26*a* is connected with the power terminal 27*a*. The power terminal 27*a* is to be connected with a connector 3*a* for power supplying. The bus bar 26*c* is to be connected with a switching element 12. More specifically, electric power supplied through the connector 3*a* is configured to be fed to the switching elements 12. Here, the circuit terminal 27*b* can be set up on the switching element, instead of being set up on the circuit wiring member. This situation does not allow a circuit terminal to be set up on the circuit wiring member.

Figure 9A:
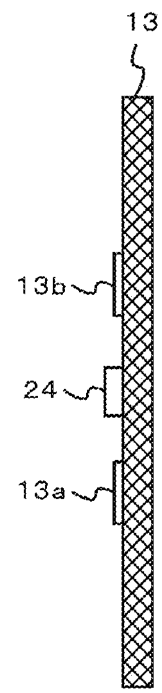
FIG. 9A is a sectional view for showing a control substrate.
Figure 9B:
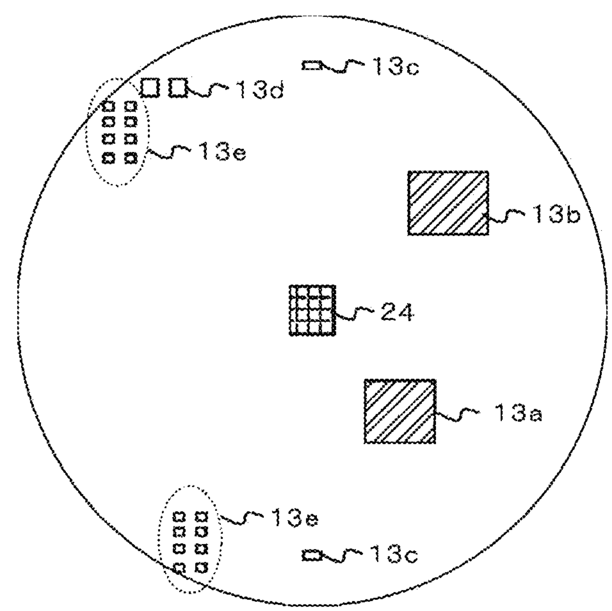
FIG. 9B is a top view for showing the control substrate.

FIG. 9A is a side view for showing a control substrate. FIG. 9B is a drawing of the control substrate viewed from a front side. In the figures, the details of the circuit are not shown and only a part of the small current elements are drawn. The control substrate 13 is like a thin plate and is almost in a circular shape, when viewed from a shaft direction, to secure an enough area for arranging parts and wiring patterns. The control substrate 13 transmits a control signal to the switching element 12 for driving a rotating electric machine moderately, based on the information received from input terminals of the connector 3*a* and the connector 3*b*. Here, among small current parts of the control substrate 13, a microcomputer 13*a*, a FET driving circuit 13*b* and others carry electric current, and then, produce more heat than different parts. Each of the circuit terminals 27*b* penetrates a respective through hole 13*e* and extends to the circuit wiring member 26*b*. The circuit terminals 27*b* are connected with a smoothing condenser 19 and a noise reduction coil 11.

Control signals are send through circuit terminals 27*b*, which electrically connect the control substrate 13 and the circuit wiring member 26*a*, the control substrate 13 and the circuit wiring member 26*b*, and the control substrate 13 and the switching elements 12. The circuit terminals 27*b* are to be fixed with the control substrate, the circuit wiring members and the switching elements, by wire bonding, press fitting or soldering and the like. The control substrate 13 has through holes 13*d* through which power terminals 27*a* pass, through holes 13*e* through which the circuit terminals 27*b* pass, and positioning portions 13*c*. The circuit terminals 27*b* pass through the through holes 13*e* and are to be connected to the control substrate. Although the microcomputer 13*a* and the FET driving circuit 13*b* and the like are supposed to be arranged on the front side here, it is obvious that they may be arranged on the rear side.

A rotary sensor 24 is arranged at a front side of the control substrate 13. The rotary sensor 24 is arranged coaxially with and further at a position close to a permanent magnet of sensor use 23. The rotary sensor 24 detects a magnetic field generated by the permanent magnet of sensor use 23, and senses the rotation angle of the rotor 16 by knowing the direction of the magnetic field. The microcomputer 13*a* calculates a moderate driving current based on the rotation angle and controls the FET driving circuit 13*b*. The rotary sensor 24 is arranged on the control substrate 13. Accordingly, wiring between the rotary sensor 24 and the control substrate 13 becomes short in length and high tolerance for noises flowing into the rotary sensor 23 from the outside is acquired. Furthermore, a set up for holding the rotary sensor 24 can be omitted and then, the number of parts for the rotating electric machine can be reduced.

Positioning portions 13*c* are provided on the control substrate 13. The positioning of the control substrate 13 is provided between the positioning portion of the control substrate and the positioning portion of the heat sink 20 or between the positioning portion of the control substrate and the positioning portion of the circuit wiring member 26. The heat sink and the control substrate are secured of their relative positioning. Simplified assembling of the heat sink and the control substrate eliminates the adjustment of the rotary sensor 24 and improves the precision level of the rotary sensor 24. Here is provided a case where the rotary sensor 24 is mounted on the control substrate. The rotary sensor 24 may be arranged on a substrate other than the control substrate or may be held with other members.

Figure 10:
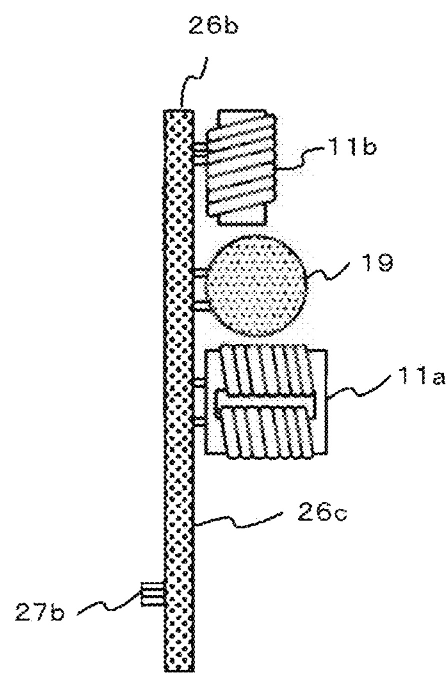
FIG. 10 is a schematic drawing of a first circuit wiring member.

FIG. 10 is a side view of a circuit wiring member 26*b*. The circuit wiring member 26*b* is arranged at a position far rear side of the control substrate 13. A bus bar 26*c*, a common mode coil 11*a*, a normal mode coil 11*b*, a smoothing condenser 19, circuit terminals (or input terminals) 27*b* and others are connected electrically with the circuit wiring member 26*b* by welding, press fitting, soldering and the like. The noise reduction coils 11, the smoothing condenser 19 and the circuit wiring member 26 are arranged at a position far rear side of the insert position of a bearing 17*b*. Accordingly, failures are prevented in the rotating electric machine to occur, when those components fall into the inside of the rotating electric machine. Further, the circuit wiring members 26*a*, 26*b* are arranged between switching elements, which are in contact with the heat sink 20, and the noise reduction coils 11. Noises of the switching elements 12 are shielded by the bus bar 26*c* of the circuit wiring member, and thereby, magnetic coupling between the switching elements and the noise reduction coils 11 can be reduced.

The electric power assist steering system 100 in accordance with Embodiment 1 of the present invention is constructed in a manner mentioned above. When a driver manipulates the steering wheel 1*a*, steering torque is transmitted to a steering shaft 1*b*. The torque sensor 2 detects the steering torque and sends a torque signal to a microcomputer 13*a*. A rotational sensor 24 detects a steering rotation count, which corresponds to a rotation detection signal. The rotation detection signals are also sent to the microcomputer 13*a*. The microcomputer 13*a* calculates assist torque, based on the received steering torque, the steering rotation count, speed signals of a vehicle and the like. The FET driving circuit 13*b* controls a rotating electric machine driving circuit (three phase bridge circuit) and generates the assist torque in the rotating electric machine 10. The assist torque is added by way of a speed reduction unit to the steering shaft 1*b*.

The FET driving circuit 13*b* produces a gate driving signal at a predetermined timing based on an instruction from the microcomputer 13 and performs the on-off control of the MOS-FETs in a three phase bridge circuit. As a result, the three phase bridge circuit generates three phase alternative current of a given quantity and feeds the three phase alternative current to the armature winding 15*b* of the stator 15. Then the rotating electric machine 10 is activated and torque generated by the rotating electric machine 10 is added to the steering shaft 1*b* as assist torque by way of a speed reduction unit. Thereby, a driver can manipulates the steering wheel (a hand grip) 1*a* with a reduced steering force. Here is provided a case where an armature winding 15*b* is in Y connection. It is obvious that the armature winding 15*b* may be in Δ connection. Here is also provided a case where the switching elements are in three phase connection. The switching elements may be in a different phase connection, like in double phase connection, five phase connection, six phase connection or others. Arrangement of at least one of the noise reduction coils and a condenser is excluded on the inside of the heat sink and between a rear side bearing and a control substrate. The heat sink can have a larger volume and improved heat capacity, while the shaft is kept small in length. In addition, the distance between the rear side bearing and the control substrate becomes smaller, and then, the rotating electric machine can have reduction in size and weight.

In the following, explanation is made about a procedure for assembling a rotating electric machine in accordance with Embodiment 1, which is configured in the above mentioned manner. First of all, a motor unit of the rotating electric machine needs to be assembled. In order to assemble a motor frame 22*a*, each of U phase, V phase and W phase windings is wound around the teeth of the stator core with insulators in between, to form an armature winding of three phase connection. Each start portion of the U phase windings is connected with each end portion of the U phase windings to complete an armature winding of U phase. Likewise, an armature winding of V phase and an armature winding of W phase need to be accomplished. Further, start portions and end portions of the U phase windings, the V phase windings and the W phase windings are connected each other to accomplish a three phase connection. Each terminal of the three phase connection is to be connected to a respective motor terminal 21. And then, a stator core is to be press fitted into a motor frame.

Figure 11:
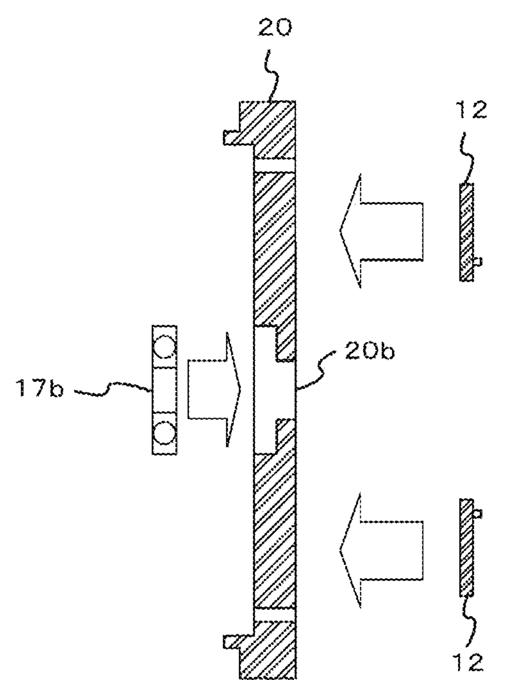
FIG. 11 is a schematic drawing for showing a step of assembling a heat sink.

In the following, explanation is made about a procedure for assembling a heat sink, with reference to FIG. 11. A process for fixing the switching elements 12 to the heat sink 20 is included here. In the heat sink 20, a shaft through hole 20*b* having a diameter smaller than the outside diameter of a bearing 17*b* and larger than the inner diameter of the bearing 17*b* is formed at a position far rear side of the bearing 17*b*. The switching elements 12 including MOS-FETs, bear chips, shunt resistors and others are bonded fixedly to the switching element arrangement portions 20*c* of the heat sink 20, with a high thermal conductive adhesive. Likewise, a power relay 30 is bonded fixedly to the switching element arrangement portion 20*h* of the heat sink 20 with a high thermal conductive adhesive. After that, the outer ring of the rear side bearing 17*b* is fixed with the shaft through hole 20*b* of the heat sink.

Figure 12:
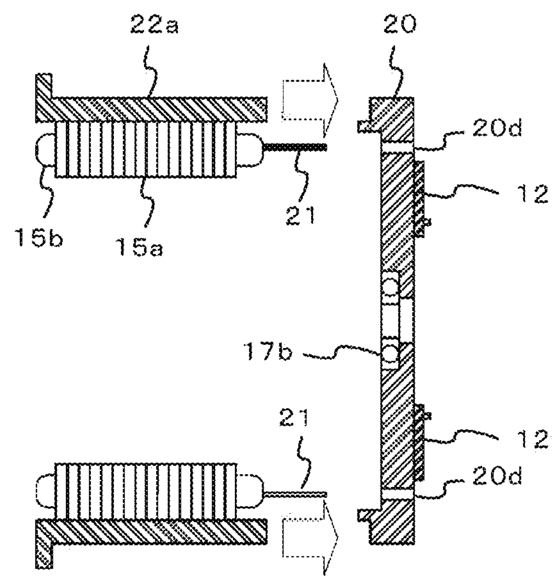
FIG. 12 is a schematic drawing for showing a step of fixing a motor frame and a heat sink.

At a next step, as shown in FIG. 12, a motor frame 22*a* of a stator is fixed with a heat sink 20, by thermal fitting, press fitting, screwing or the like. At this time, motor terminals 21, which are connected with terminals of three phase connection, are to be inserted into the electric wiring through holes 20*d* provided on the heat sink 20. At this time, the motor terminals 21 protrude from the heat sink 20 towards a rear side direction. Then, the motor terminals 21 and the switching elements are to be connected electrically by welding, press fitting, soldering and the like. This step can be eliminated, provided that the motor terminals 21 and the switching elements are integrated.

Figure 13:
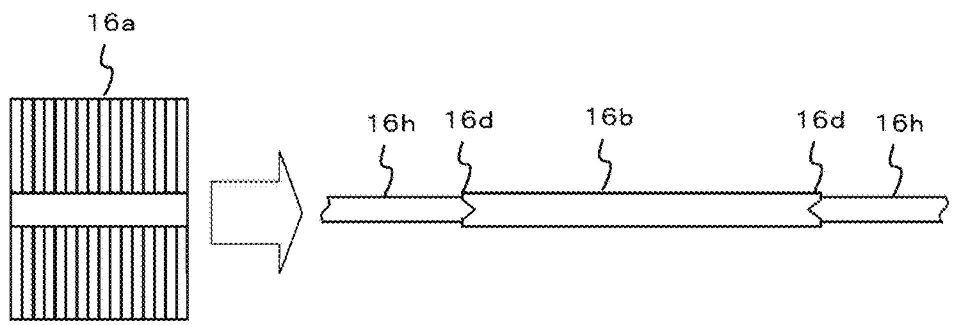
FIG. 13 is a schematic drawing for showing a step of press fitting a rotor core into a rotor shaft (a shaft).
Figure 14:
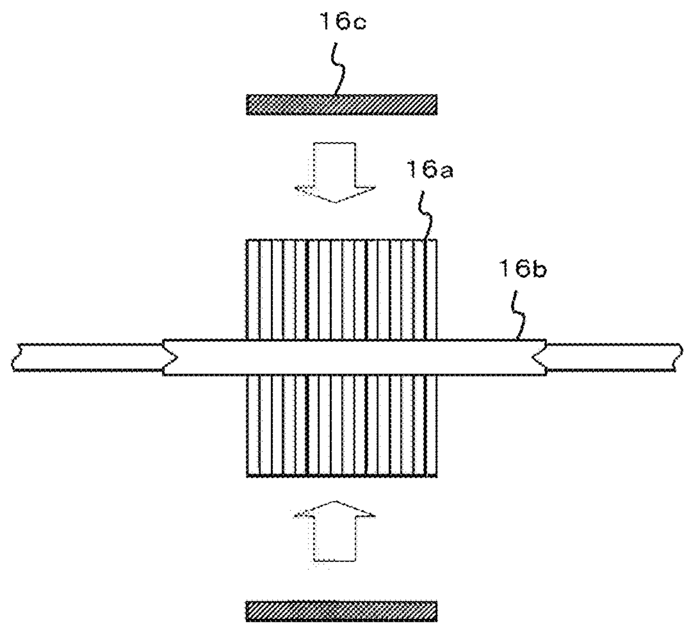
FIG. 14 is a schematic drawing for showing a step of bonding permanent magnets to a rotor core with an adhesive.
Figure 15:
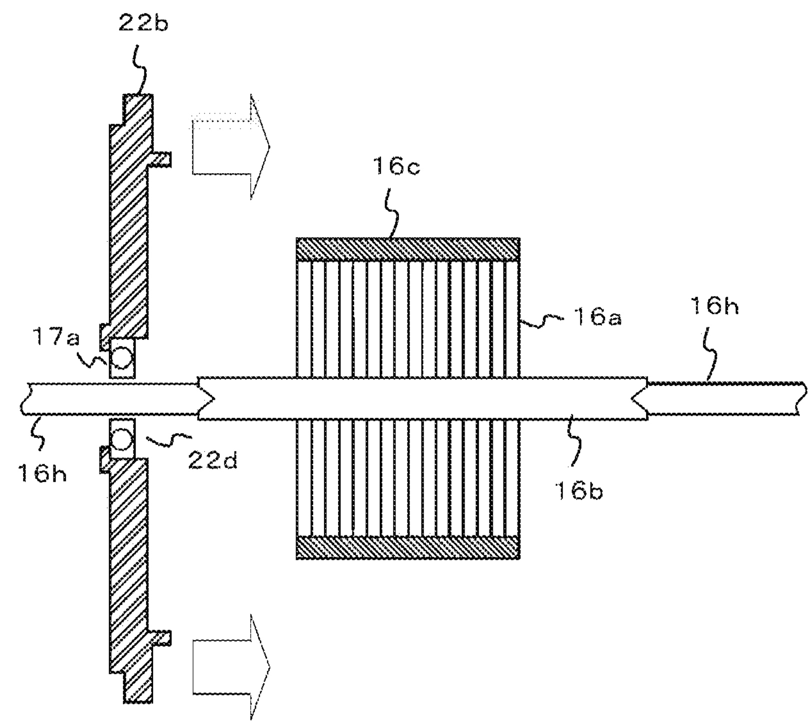
FIG. 15 is a schematic drawing for showing a step of fixing the outer ring of a front side bearing to the shaft through hole of a housing.

In the following, explanation is made about an assembling method of a rotor 16, with reference to FIG. 13 to FIG. 15. As shown in FIG. 13, each shaft holding jig 16*h* is fixed to a shaft holding portion 16*d* arranged at one of the both ends of a rotor shaft 16*b*. The rotor shaft 16*b* is, then, fixed from the both ends. After that, a rotor core 16*a* is press fitted into the rotor shaft 16*b*. Further, as shown in FIG. 14, permanent magnets 16*c* are bonded fixedly on the rotor core 16*a* with an adhesive. The permanent magnets 16*c* may be magnetized before bonding with an adhesive or may be magnetized with a magnetizer after bonded with an adhesive. At a next step, as shown in FIG. 15, the outer ring of a front side bearing 17*a* is fixed to the shaft through hole 22*d* of the front side housing 22*b*. A worker makes the shaft holding jig 16*h* to penetrate through the shaft through hole 22*d* of the front side housing 22*b*. Further, a front side bearing 17*a* of the housing is press fitted into a predetermined position.

Figure 16:
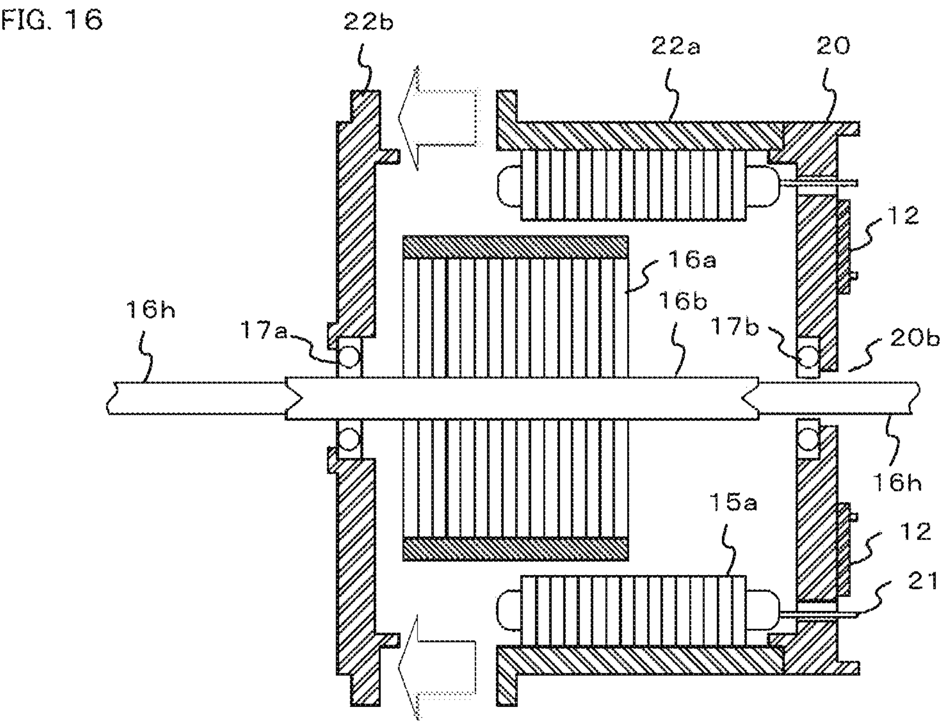
FIG. 16 is a schematic drawing for showing a step of inserting a heat sink into the rotor.

In the following, with reference to FIG. 16, explanation is made about a step for inserting a heat sink into the rotor. First of all, a shaft holding jig 16*h* is inserted into the shaft through hole 20*b* of the heat sink 20. The rotary shaft 16*b* of the rotor 16, which is held with the shaft holding jigs 16*h*, is then inserted into a bearing 17*b* of the rear side. The bearing 17*b* on the rear side of the heat sink is press fitted into a position in which the motor frame 22*a* can make contact with a front side housing 22*b*.

Figure 17:
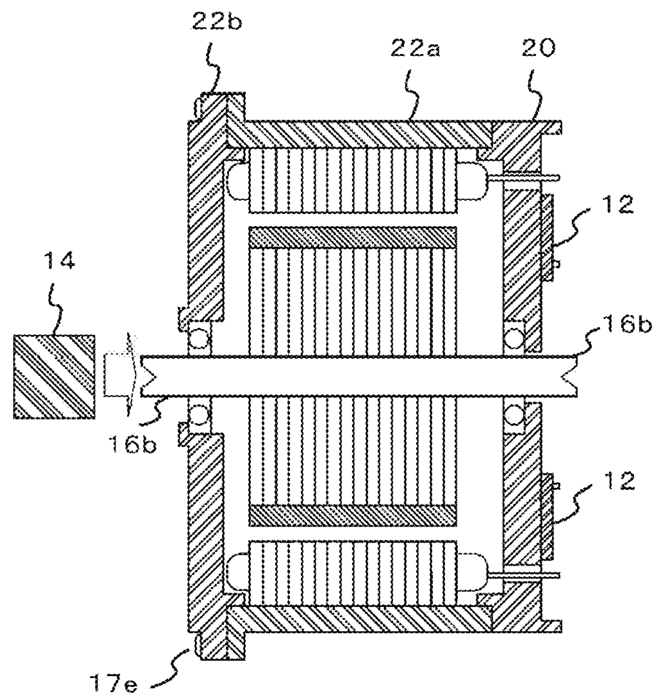
FIG. 17 is a schematic drawing for fixing a pulley.

In the following, explanation is made about a step for fixing a pulley, with reference to FIG. 17. After the step of press fitting, the front side housing 22*b* and the motor frame 22*a* are fixed with bolts (or screws) 17*e* or the like. The shaft holding jigs 16, which are provided on the both ends of the rotary shaft 16*b*, are took away. A pulley 14 is fixed to the front side end of the rotary shaft (a shaft) 16*b*. Explanations offered above are on the assembling process of the motor unit of the rotating electric machine 10.

Figure 18:
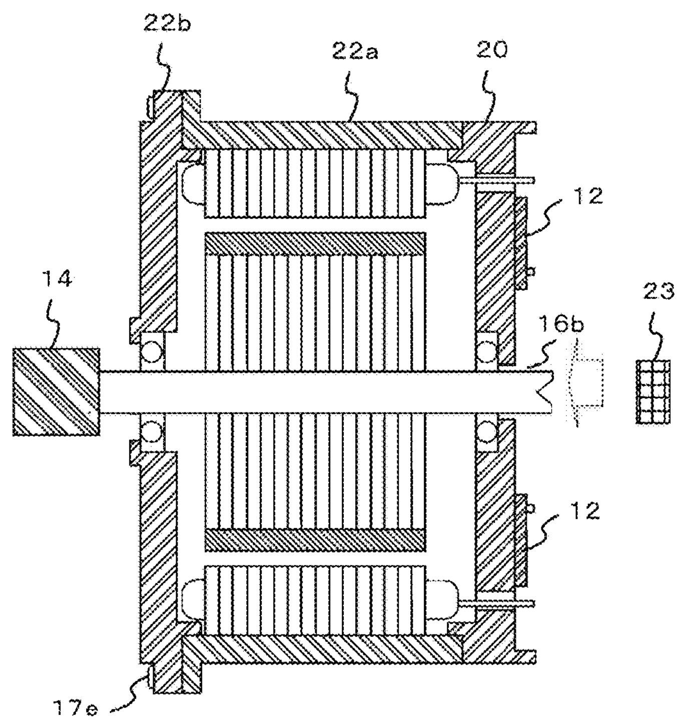
FIG. 18 is a schematic drawing for showing a step of fixing a permanent magnet of sensor use to a shaft.

In the following sentences, explanation is made about assembling of a control device 4. At first, in reference to FIG. 18, explanation is made about fixing a permanent magnet of sensor use 23 to a rotary shaft 16*b*. A magnetized permanent magnet of sensor use 23 is fixed to the rear side end of the rotary shaft 16*b* from the rear side thereof. The permanent magnet of sensor use 23 may be magnetized by a magnetizer after the magnet is fixed to the rotary shaft 16*b*.

Figure 19:
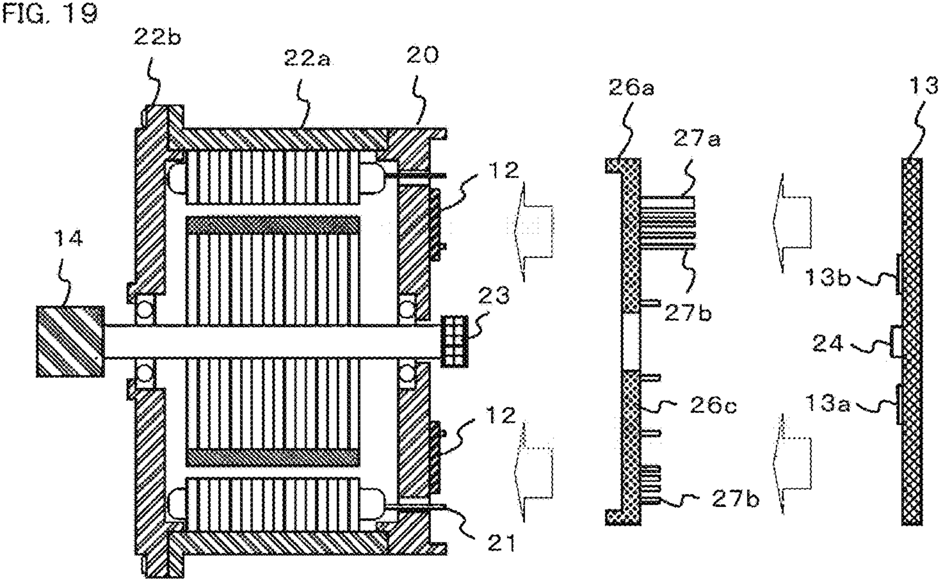
FIG. 19 is a schematic drawing for showing a step of mounting a second circuit wiring member and a control substrate.

In the following sentences, explanation is made about the method of mounting a circuit wiring member 26*a* and a control substrate 13, with reference to FIG. 19. The circuit wiring member 26*a*, which is integrally resin molded with a bus bar 26*c*, a power terminals 27*a*, circuit terminals 27*b* and others, is fixed to the rear side of the heat sink 20, by employing an adhesive, screws or the like. The switching elements 12 and the bus bar 26*c* of the circuit wiring member 26*a* are electrically connected by welding, wire bonding, press fitting, soldering or the like. After solder cream is pasted on a control substrate 13, a microcomputer 13*a*, a FET driving circuit 13*b*, a rotary sensor 24 and other small current parts like peripheral circuit elements are mounted on the control substrate 13. After that, the solder cream is dissolved in a reflow system and those parts are soldered thereto.

Further, the control substrate 13 needs to be arranged at a position far rear side of the heat sink 20 and the circuit wiring member 26*a*. Positioning of the rotary sensor 24 arranged on the control substrate 13 and the permanent magnet of sensor use 23 arranged at an end portion of the rotary shaft is achieved by fitting the positioning portions 13*c* of the control substrate 13 with the positioning portions arranged on the circuit wiring member 26*a*. At the same time, connection of the control substrate 13, the circuit wiring member 26*b* and circuit terminals 27*b* is made electrically by wire bonding, press fitting, soldering or the like.

Figure 20:
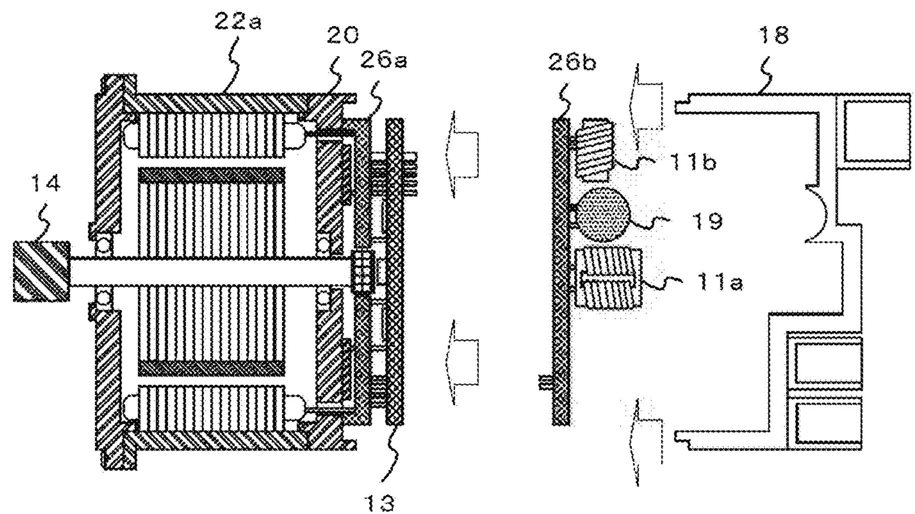
FIG. 20 is a schematic drawing for showing a step of fixing a first circuit wiring member and a control device case.

In the following sentences, explanation is made about the method of fixing a circuit wiring member 26*b*, which is to be arranged at a position far rear side of the control substrate 13, with reference to FIG. 20. The circuit wiring member 26*b* has a bus bar integrally molded with a resin. A common mode coil 11*a*, a normal mode coil 11*b* and a smoothing condenser 19 are mounted on the circuit wiring member 26*b*. The circuit wiring member 26*b* is arranged on the rear side of the control substrate 13. Wirings (power terminals 27*a*, circuit terminals 27*b* and others) extending towards the rear side of the control substrate 13 from the circuit wiring member 26*a* and wirings (circuit terminals 27*b*) extending towards the rear side from the control substrate 13 are connected electrically with the circuit wiring member 26*b* arranged on the rear side of the control substrate by welding, press fitting, soldering or the like. At the next step, a control device case 18 is attached from the rear side and fixed to the heat sink 20 with an adhesive, screws and others. By all of these steps, whole thing is made for assembling the control device 4 and the rotating electric machine 10.

As described above, a process for fixing a motor frame to a heat sink is achieved after a process for fixing switching elements to the heat sink. The motor terminals do not protrude from the heat sink at the fixing process of the switching elements. Accordingly, produced is an advantageous effect like that assembling of the parts is more effectively achieved. A process for fixing a permanent magnet of sensor use to a shaft is achieved after the process of assembling the rotating electric machine. A permanent magnet of sensor use with a diameter larger than a minimal portion of the shaft through hole of the heat sink is allowed to be attached to the rear side. Then, the magnetic field of the permanent magnet of sensor use becomes uniform and the precision level of the rotor sensor 24 is improved. Especially, it is more evident, when the diameter of the permanent magnet of sensor use is larger than the outer diameter of the rotor shaft. Further, a process for mounting the control substrate is achieved after the process for assembling the rotating electric machine. Assembling of the motor frame, the heat sink, the housing and others can be made, while the shaft is fixed from both ends thereof. At the time of assembling a stator and a rotor, contact of the stator and the rotor can be avoided.

Embodiment 2.

Figure 21A:
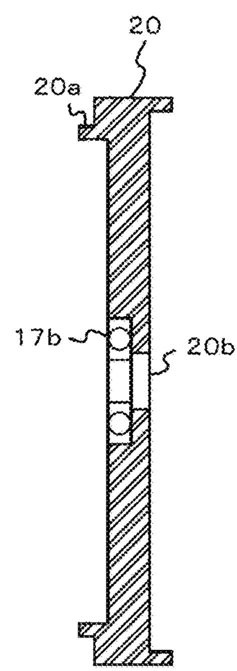
FIG. 21A is a sectional view for showing a heat sink in accordance with Embodiment 2 and FIG. 21B is a top view for showing the heat sink in accordance with Embodiment 2.
Figure 21B:
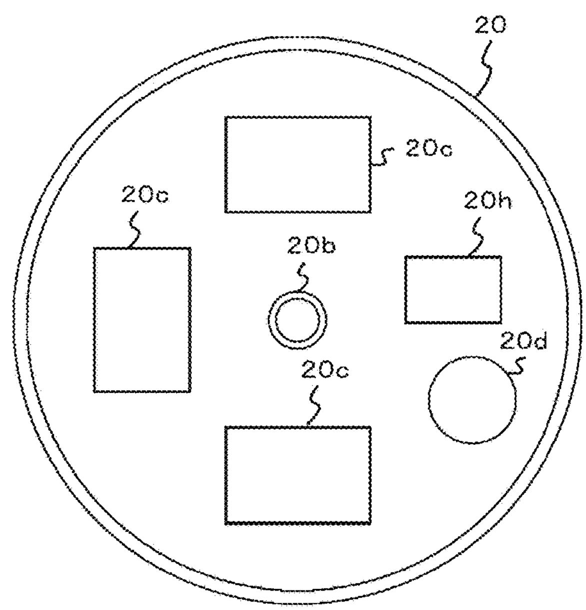

FIG. 21A and FIG. 21B are illustrative drawings of the rotating electric machine in accordance with Embodiment 2 of the present invention. The structure of a heat sink is basically the same as that of Embodiment 1. As shown in the drawing, the heat sink takes a configuration in which three motor terminals 21 pass through a single electric wiring through hole 20*d*. A control substrate 13, having parts of small current use on the rear side, is provided closely to a heat sink 20. The heat sink has a smaller number of holes and then, the volume of the heat sink is increased. Accordingly, the heat sink is improved in heat capacity and the switching elements are improved in cooling performance. By the way, here is provided a case where the motor terminals pass through the electric wiring through hole. Electric wirings, such as other signal wires, cables and the like, which connect between the rotating electric machine and the control device, may pass through the electric wiring through hole. It is obvious that similar effects are produced even in that case.

Embodiment 3.

Figure 22:
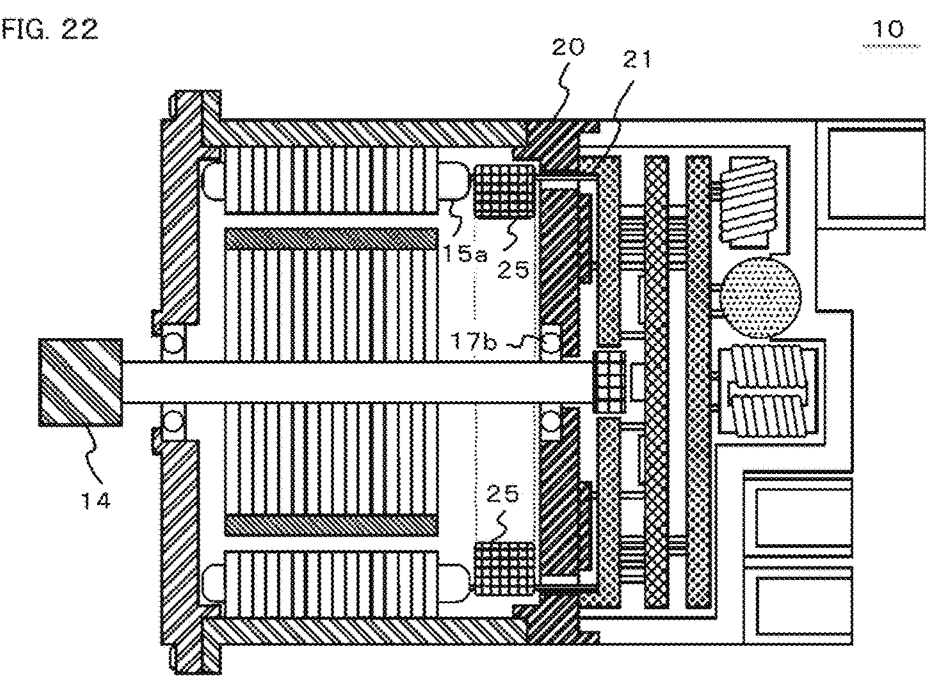
FIG. 22 is a schematic drawing for showing a rotating electric machine in accordance with Embodiment 3.

FIG. 22 is an illustrative drawing of the rotating electric machine in accordance with Embodiment 3 of the present invention. The structure of a rotating electric machine is basically the same as that of Embodiment 1. As shown in the drawing, the rotating electric machine takes a configuration in which three phase connections of an armature winding are connected to motor terminals 21 by way of a ring like connection plate 25. In the armature winding of the rotor core 15*a*, windings are connected each other and constitute a three phase connection. The connection plate 25 is disposed between the motor terminals 21 and the armature winding 15*b*.

Embodiment 4.

Figure 23A:
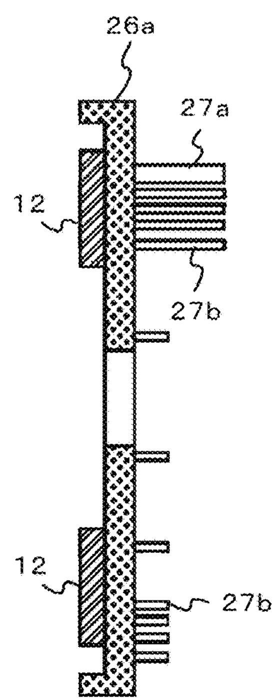
FIG. 23A is a sectional drawing for showing a second circuit wiring member in accordance with Embodiment 4 and FIG. 23B is a top drawing for showing the second circuit wiring member in accordance with Embodiment 4.
Figure 23B:
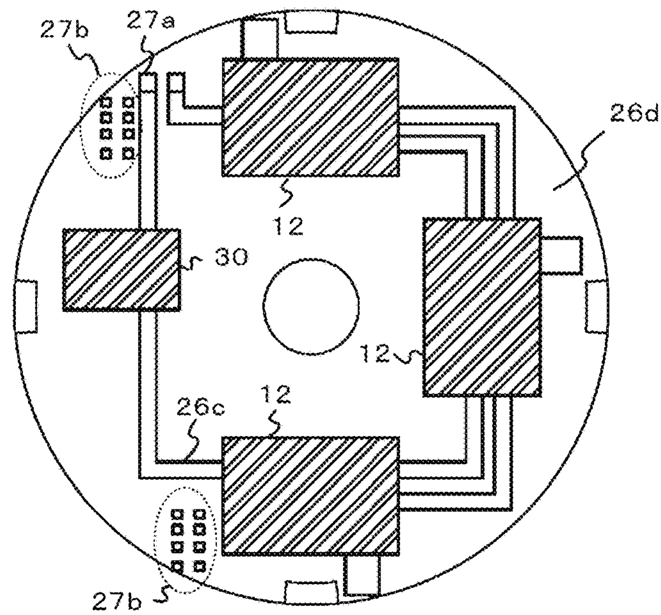

FIG. 23A and FIG. 23B are illustrative drawings of the rotating electric machine in accordance with Embodiment 4 of the present invention. The structure of a rotating electric machine is basically the same as that of Embodiment 1. As shown in the drawings, the embodiment takes a configuration in which switching elements 12 are integrated with a circuit wiring member 26*a*. The circuit wiring member 26*a* is made up of bus bars 26*c*, a frame 26*d*, power terminals 27*a*, power terminals 27*b* and others. The frame 26*d* is made of insulation material like plastic, and holds the bus bars 26*c* and the like. The bus bars 26*c* of the circuit wiring member 26*a* are connected with the power terminals 27*a*.

Embodiment 5.

Figure 24:
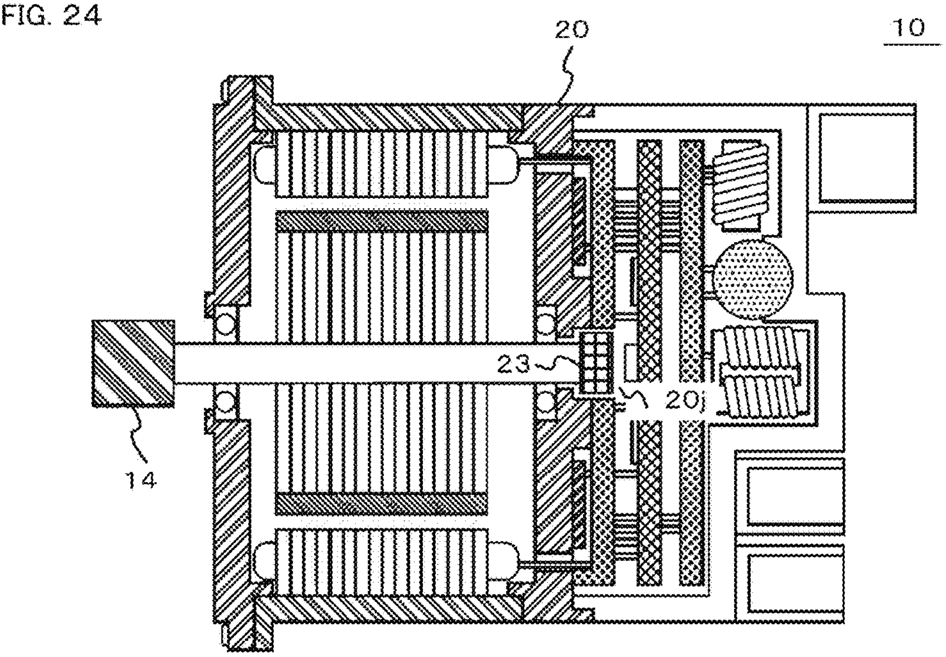
FIG. 24 is a schematic drawing for showing a rotating electric machine in accordance with Embodiment 5.

FIG. 24 is an illustrative drawing of the rotating electric machine in accordance with Embodiment 5 of the present invention. As the structure of the rotating electric machine is basically the same as that of Embodiment 1, supplementary explanation is made, in reference to the drawing, about a permanent magnet of sensor use 23. There was provided a case where a permanent magnet of sensor use 23 protrudes from a heat sink towards a rear side direction. The permanent magnet of sensor use 23 may sink at least partly in a heat sink to be buried therein. Similar effects are produced in that case. Here is formed a rear side concave portion 20*j* in the heat sink 20. The permanent magnet of sensor use 23 is depressed into the rear side concave portion 20*j* and is buried therein.

Embodiment 6.

Figure 25:
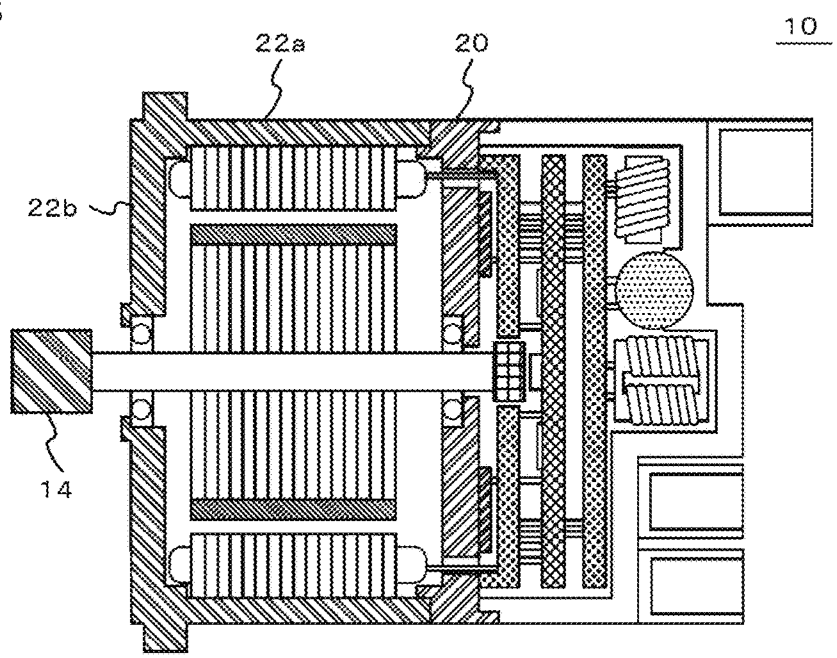
FIG. 25 is a schematic drawing for showing a rotating electric machine in accordance with Embodiment 6.

FIG. 25 is an illustrative drawing of the rotating electric machine in accordance with Embodiment 6 of the present invention. As the structure of a rotating electric machine is basically the same as that of Embodiment 1, supplementary explanation is made, in reference to the drawing, about a housing. A motor frame 22*a* is integrated with a front side housing 22*b* which is arranged in the frontal portion of the rotating electric machine. Accordingly, the heat thermal resistance between the housing and the motor frame is reduced and the motor frame is improved in cooling performance. Further, the motor frame is arranged coaxially with a rotor shaft at an elevated level and thereby the rotating electric machine can have reduced vibrations.

Embodiment 7.

Figure 26:
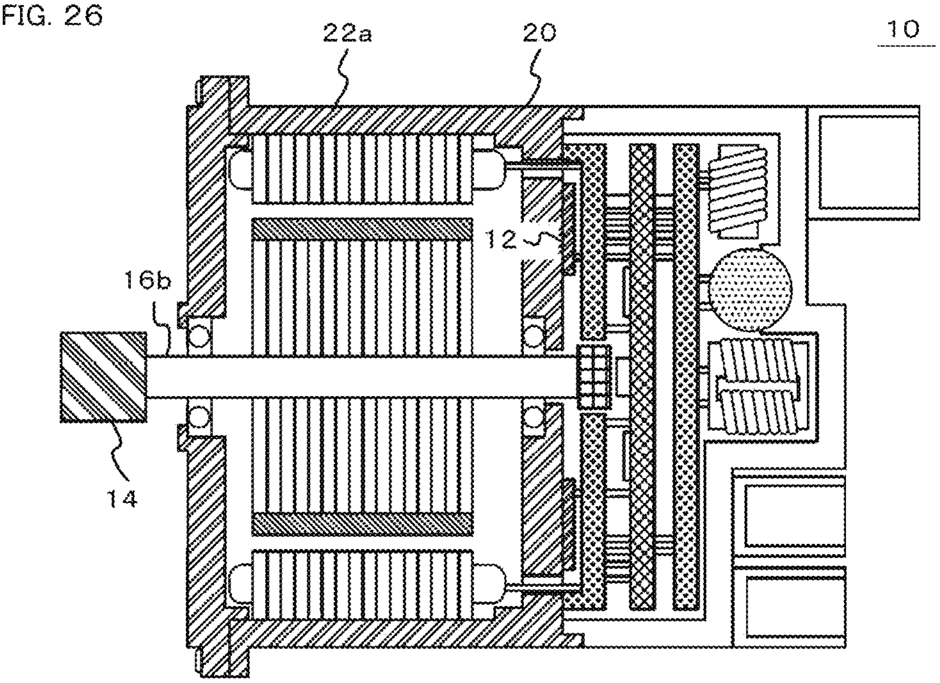
FIG. 26 is a schematic drawing for showing a rotating electric machine in accordance with Embodiment 7.

FIG. 26 is an illustrative drawing of the rotating electric machine in accordance with Embodiment 7 of the present invention. As the structure of a rotating electric machine is basically the same as that of Embodiment 1, supplementary explanation is made, in reference to the drawing, about a motor frame. A motor frame 22*a* is integrated with a heat sink 20. The heat thermal resistance between the heat sink 20 and the motor frame 22*a* is reduced and then, the switching elements 12 are improved in cooling performance. Further, the motor frame 22*a* is arranged coaxially with a rotor shaft 16*b* at an elevated level and thereby the rotating electric machine 10 can have reduced vibrations.

Embodiment 8.

Figure 27:
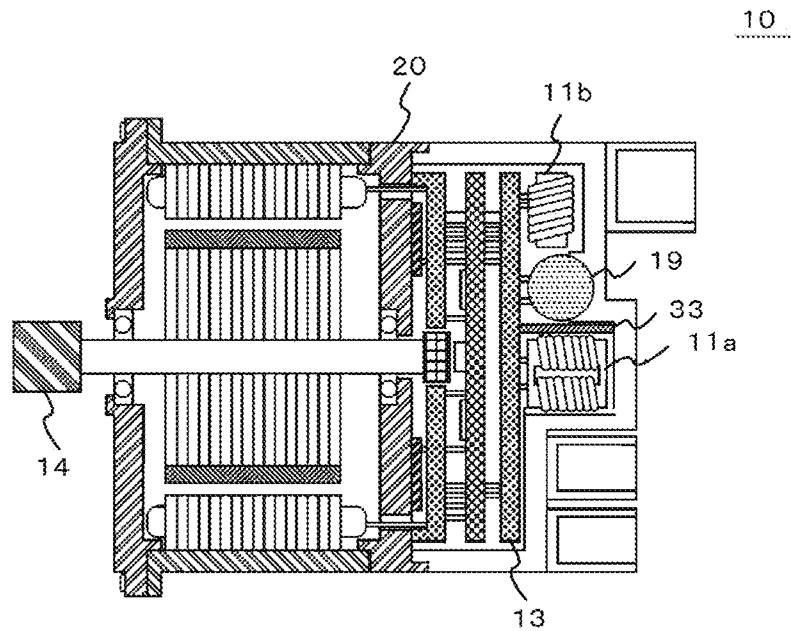
FIG. 27 is a schematic drawing for showing a rotating electric machine in accordance with Embodiment 8.

FIG. 27 is an illustrative drawing of the rotating electric machine in accordance with Embodiment 8 of the present invention. The structure of a rotating electric machine is basically the same as that of Embodiment 1. Here is provided a case in which a noise shielding member 33 is arranged in the circumference of the noise reduction coils 11. In the drawing, an example is shown in which a noise shielding member 33 is inserted between a common mode coil 11*a* and a normal mode coil 11*b*. By the arrangement of the noise shielding member 33, magnetic coupling of the closely arranged common mode coil 11*a* and normal mode coil 11*b* can be decreased. Malfunction of the control device is prevented. The rotating electric machine 10 can operate smoothly and have reduced vibrations and noises. The noise shielding member is, for an example, a metal plate and the like. The noise reduction coils 11 and a smoothing condenser 19 are supposed to be arranged on a rear side of the control substrate 13. It is obvious that the rotating electric machine has similar effects, even in a case where at least one of the noise reduction coils 11 and the smoothing condenser 19 is arranged at a position far more rear side of the control substrate 13.

Embodiment 9.

Figure 28:
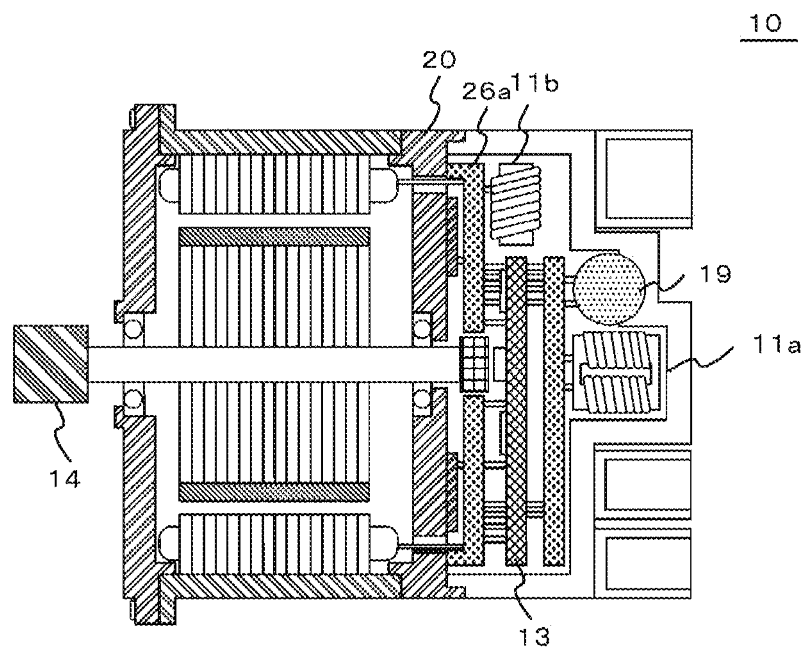
FIG. 28 is a schematic drawing for showing a rotating electric machine in accordance with Embodiment 9.

FIG. 28 is an illustrative drawing of the rotating electric machine in accordance with Embodiment 9 of the present invention. The structure of a rotating electric machine is basically the same as that of Embodiment 1. As shown in the drawing, a smoothing condenser 19 and a common mode coil 11*a* are arranged at a position far rear side of the control substrate 13. A normal mode coil 11*b* is arranged on a circuit wiring member 26*a* and occupies partly an area of the control substrate 13 in a shaft direction. Here is provided a case in which the normal mode coil 11*b* occupies partly an area of the control substrate 13 in a shaft direction. It is obvious that the smoothing condenser 19 or the common mode coil 11*a* can be employed as a component which occupies partly an area of the control substrate 13 in a shaft direction. Further, a common mode coil 11*a* and a normal mode coil 11*b* constitute the noise reduction coils 11 here. It is obvious that similar effects are produced, even when the noise reduction coil 11 is composed of only one of those coils.

Embodiment 10.

Figure 29:
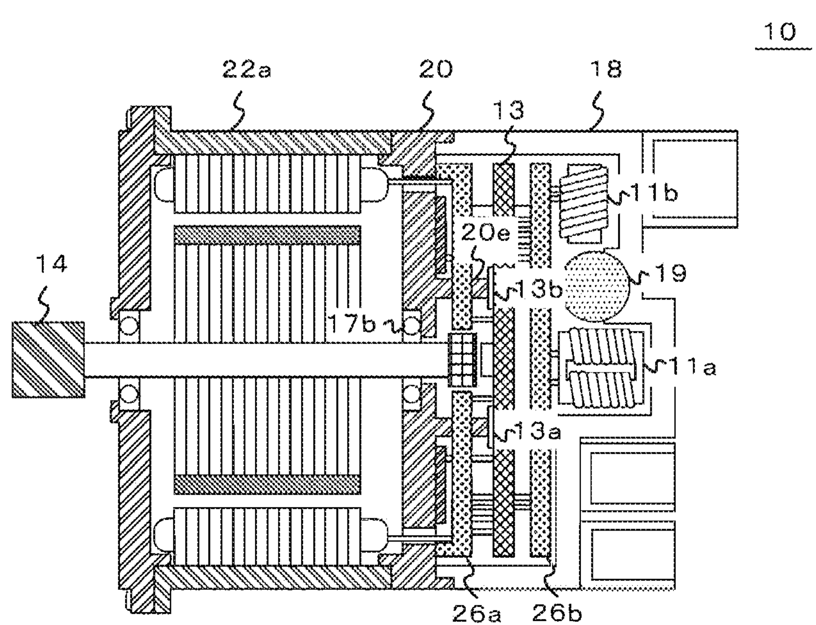
FIG. 29 is a schematic drawing for showing a rotating electric machine in accordance with Embodiment 10.

FIG. 29 is an illustrative drawing of the rotating electric machine in accordance with Embodiment 10 of the present invention. The structure of a rotating electric machine is basically the same as that of Embodiment 1. As shown in the drawing, a heat sink 20 has a rear side protrusion portion 20*e* which protrudes to the control substrate 13. The rear side protrusion portion 20*e* is ring like or column like, and contacts with at least one of heat generating components (a microcomputer 13*a*, FET driving circuits 13*b* and others) of the control substrate 13 by way of grease and the like, or arranged closely to the heat generating components. Accordingly, the heat generating components of the control substrate 13 can be improved in heat radiation and cooling performance. Moreover, the noise reduction coils 11 and the smoothing condenser 19 are arranged at a position far rear side of the circuit wiring member 26*b*. The distance between a rear side bearing 17*b* and a control substrate 13 becomes then smaller. In consequence, the rear side protrusion portion 20*e* can be short in length, and the rotating electric machine can have reduction in size and weight.

The rear side protrusion portion 20*e* of the heat sink may be employed as a member for positioning the heat sink 20*b* and a control substrate 13. The rear side protrusion portion 20*e* determines a relative position between the heat sink 20*b* and a control substrate 13. Assembling processes become simplified and adjustments are excluded between the heat sink and the control substrate. The rotor sensor 24 of the control substrate can be improved in precision level. By the way, the rear side protrusion portion 20*e* is supposed to be in contact with the heat generating components of the control substrate by way of grease. It is obvious that similar effects are produced, when the rear side protrusion portion 20*e* is in contact with the control substrate by way of grease, and in addition, the heat generating components of the control substrate are arranged closely to the contact area of the control substrate and the protrusion. Further, here is provided a case in which the rear side protrusion portion 20*e* is in contact with the control substrate by way of grease and the like. Similar effects are produced, even when the rear side protrusion portion 20*e* is made to directly contact with the heat generating components or to be arranged closely to the components.

Embodiment 11.

Figure 30A:
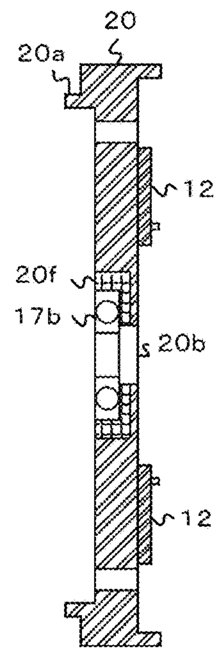
FIG. 30A is a sectional drawing for showing a heat sink in accordance with Embodiment 11 and FIG. 30B is a top drawing for showing the heat sink in accordance with Embodiment 11.
Figure 30B:
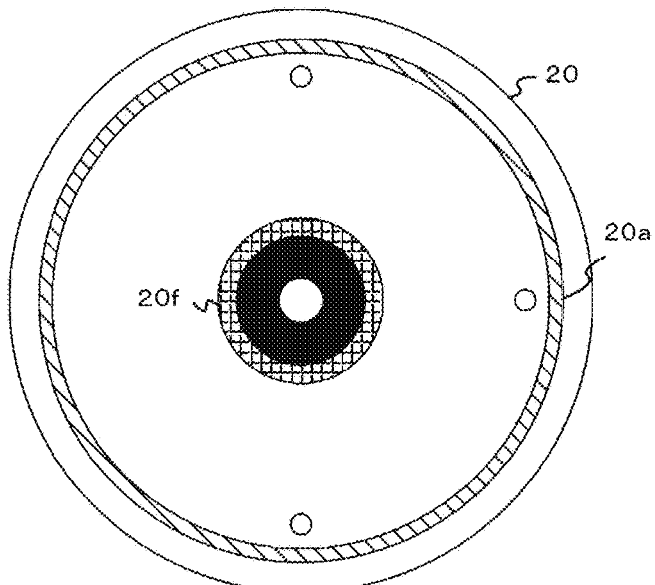

FIG. 30A and FIG. 30B are illustrative drawings of the rotating electric machine in accordance with Embodiment 11 of the present invention. The structure of a rotating electric machine is basically the same as that of Embodiment 1. As shown in the drawing, an insulation member 20*f* is inserted between a rear side bearing 17*a* and a heat sink 20. By adopting the arrangement described here, the rear side bearing 17 can be restrained in temperature rise, when the temperature of the heat sink rises due to the heat produced by switching elements 12. Accordingly, antifriction and the like are prevented from deterioration and the bearings can have a longer life. Further, the embodiment accepts a structure which has a high heat thermal resistance with the heat sink 20. It is obvious that similar effects are produced in the structure, even when the insulation member 20*f* is not inserted.

Embodiment 12.

Figure 31A:
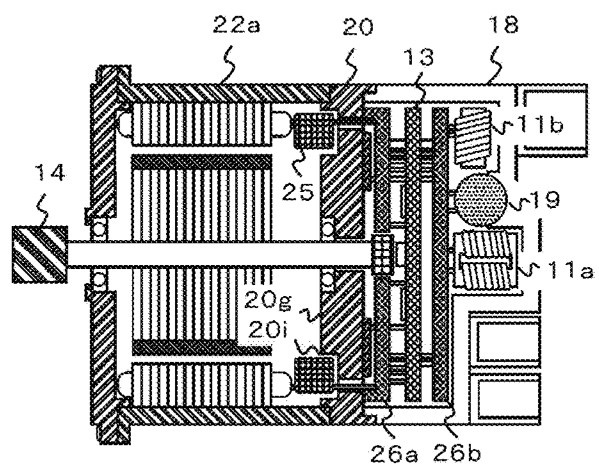
FIG. 31A is a sectional drawing for showing a rotating electric machine in accordance with Embodiment 12 and FIG. 31B is a top drawing for showing the rotating electric machine in accordance with Embodiment 12.
Figure 31B:
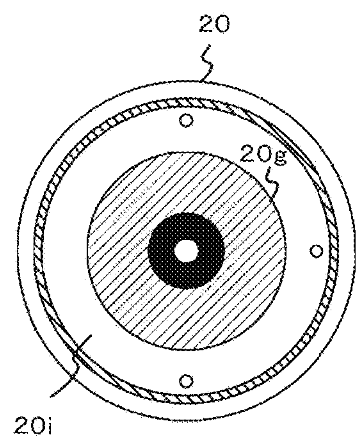

FIG. 31A and FIG. 31B are illustrative drawings of the rotating electric machine in accordance with Embodiment 12 of the present invention. The structure of a rotating electric machine is basically the same as that of Embodiment 1. As shown in the drawing, a heat sink 20 has a front side protrusion portion 20*g*, which protrudes, towards a front side direction, at a position where a connection plate 25 occupies an area of the heat sink in a shaft direction. Then, the heat sink has an improved heat capacity and the switching elements are improved in cooling performance. Further, a rear side bearing is arranged in the front side protrusion portion 20*g*. Then, the distance from the rear side bearing to the control substrate becomes smaller and the rotating electric machine has reduced vibrations. Further, the heat sink has a ring like front side concave portion 20*i*, which contains a connection plate 25 protruding towards a rear side direction of the rotating electric machine. Accordingly, the rotating electric machine can have reduction in size and weight.

Embodiment 13.

Figure 32A:
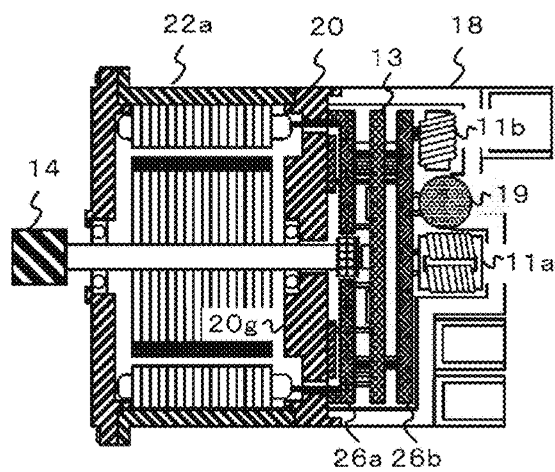
FIG. 32A is a sectional drawing for showing a rotating electric machine in accordance with Embodiment 13 and FIG. 32B is a top drawing for showing the rotating electric machine in accordance with Embodiment 13.
Figure 32B:
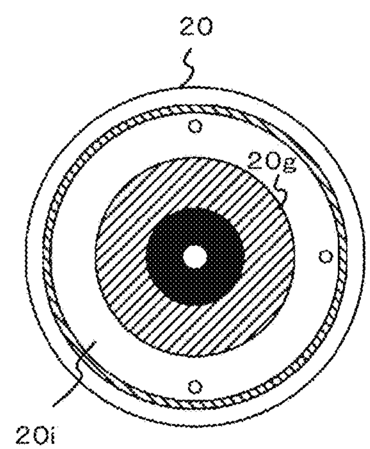

FIG. 32A and FIG. 32B are illustrative drawings of the rotating electric machine in accordance with Embodiment 13 of the present invention. The structure of the rotating electric machine is basically the same as that of Embodiment 1. As shown in the drawings, the heat sink 20 includes a front side protrusion portion 20*g*, which protrudes, towards a front side direction, at a position where the rear side coil ends of the armature winding occupy an area of the heat sink in a shaft direction. Then, the heat sink has an improved heat capacity and the switching elements are improved in cooling performance. Further, a rear side bearing is arranged in the front side protrusion portion 20*g*. Then, the distance from the rear side bearing to the control substrate becomes smaller and vibrations of the rotating electric machine can be reduced. Furthermore, coil ends of the armature winding protrude towards a rear side direction of the rotating electric machine and the heat sink includes a ring like front side concave portion 20*i*, which contains the coil ends of the armature winding. Accordingly, the rotating electric machine can have reduction in size and weight.

Embodiment 14.

Figure 33A:
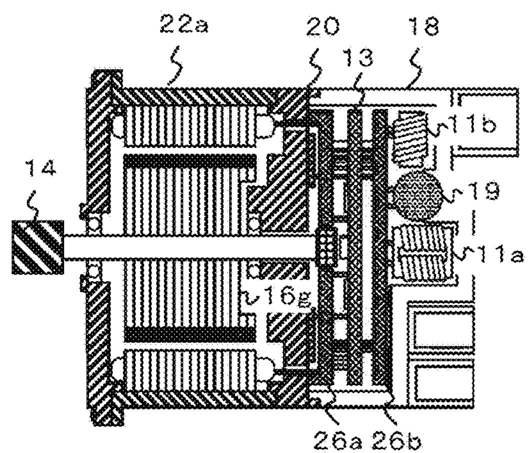
FIG. 33A is a sectional drawing for showing a rotating electric machine in accordance with Embodiment 14 and FIG. 33B is a top drawing for showing the rotating electric machine in accordance with Embodiment 14.
Figure 33B:
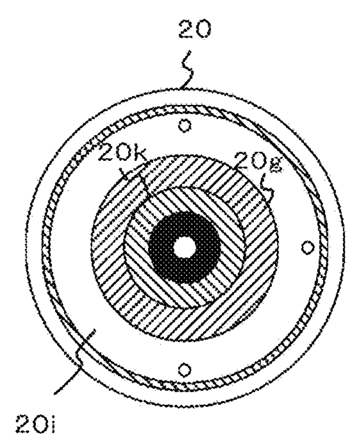

FIG. 33A and FIG. 33B are illustrative drawings of the rotating electric machine in accordance with Embodiment 14 of the present invention. The structure of the rotating electric machine is basically the same as that of Embodiment 1. As shown in the drawings, the heat sink 20 is provided with a protrusion portion 20*k*, which protrudes, towards a front side direction, at a position where the protrusion portion 20*k* laps over a rotor core concave portion 16*g* in a shaft direction. Then, the heat sink has an improved heat capacity and the switching elements are improved in cooling performance. Further, the rear side bearing 17*b* is arranged in the protrusion portion 20*k*. Then, the distance from the rear side bearing to the control substrate becomes further smaller and vibrations of the rotating electric machine can be reduced. Furthermore, coil ends of the armature winding protrude towards a rear side direction of the rotating electric machine and the heat sink has a ring like front side concave portion 20*i*, which contains the coil ends of the armature winding. Accordingly, the rotating electric machine can have reduction in size and weight.

Embodiment 15.

Figure 34:
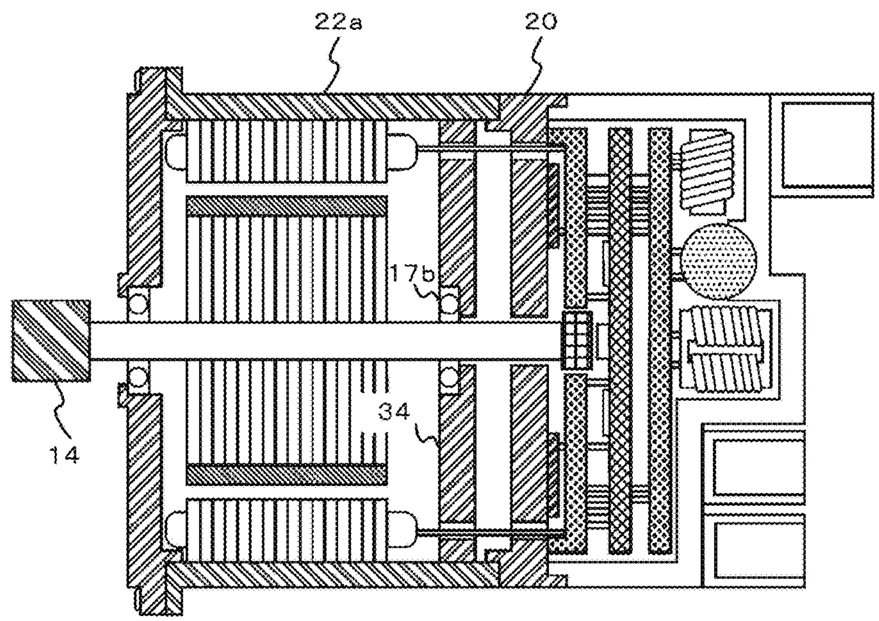
FIG. 34 is a schematic drawing for showing a rotating electric machine in accordance with Embodiment 15.

FIG. 34 is an illustrative drawing of the rotating electric machine in accordance with Embodiment 7 of the present invention. As the structure of the rotating electric machine is basically the same as that of Embodiment 1, supplementary explanation is made, in reference to the drawing, about a heat sink. The switching elements 12 are bonded to the heat sink 20 with an adhesive. A rear side bearing 17*b* is supported with a rear side housing 34. In this way, the rear side housing 34 is provided here and thereby the rear side bearing 17*b* can be suppressed in temperature rise. Although the number of components is on the increase, the rotating electric machine can have a longer life.

Embodiment 16.

Figure 35:
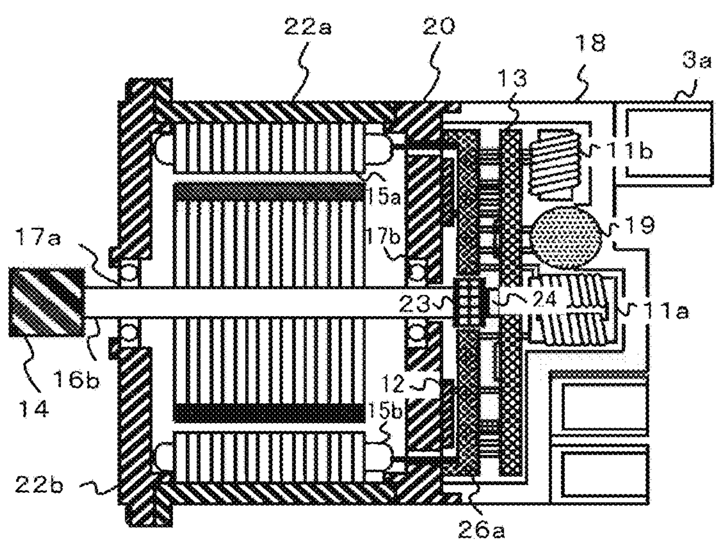
FIG. 35 is a schematic drawing for showing a rotating electric machine in accordance with Embodiment 16.

FIG. 35 is an illustrative drawing of the rotating electric machine in accordance with Embodiment 16 of the present invention. A circuit wiring member 26*a* is one member which is arranged at a position far rear side of a heat sink 20 and also at a position far front side of a control substrate 13. Bus bars 26*c*, a common mode coil 11*a*, a normal mode coil 11*b*, a smoothing condenser 19, circuit terminals (input terminals) 27*b* and others are connected electrically to the circuit wiring member 26*a* by welding, press fitting, soldering or the like. The noise reduction coils 11, the smoothing condenser 19 and the circuit wiring member 26*a* are arranged on the far rear side of a position where a bearing 17*b* is inserted. Then, failures can be prevented in the rotating electric machine to occur, when those components fall into the inside of the rotating electric machine. The circuit wiring member 26*a* is arranged between the switching elements 12 mounted on the control substrate 20 and noise reduction coils 11. Noises of the switching elements 12 are shielded by the bus bars 26*c* of the circuit wiring member 26*a* and magnetic coupling between the switching elements and the noise reduction coils 11 can be reduced.

Figure 36A:
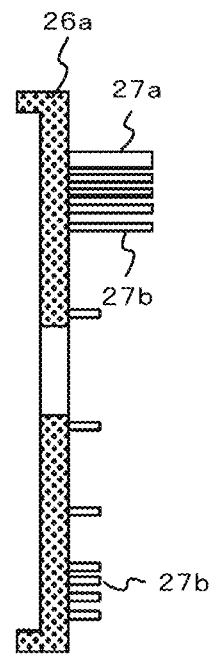
FIG. 36A is a cross section view for showing a second circuit wiring member and FIG. 36B is a planar view for showing the second circuit wiring member.
Figure 36B:
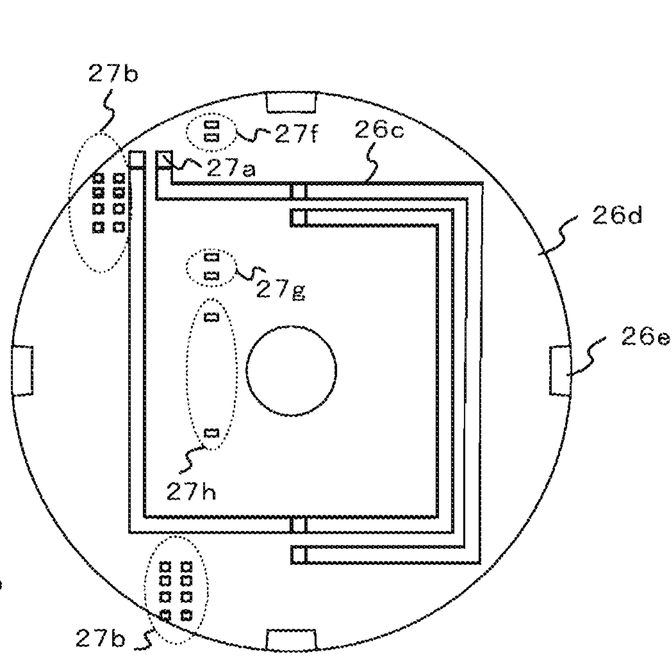
Figure 37A:
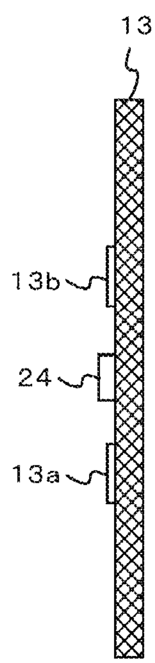
FIG. 37A is a cross section view for showing a control substrate and FIG. 37B is a planar view for showing the control substrate.
Figure 37B:
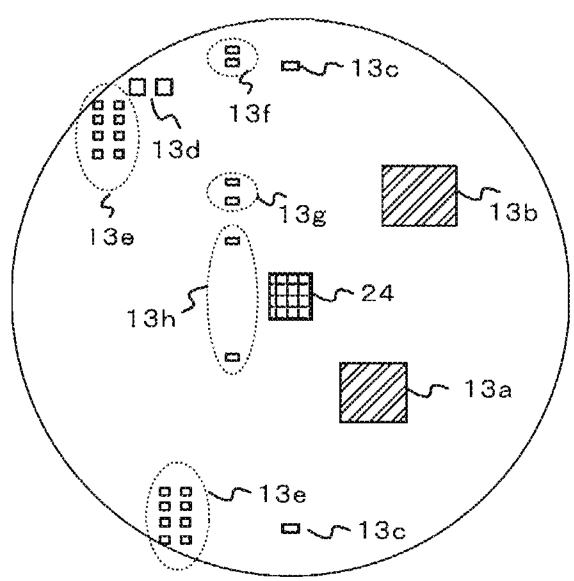

FIG. 36A and FIG. 36B show an example of the circuit wiring member 26*a*. Circuit terminals 27*f* are to be connected to a normal mode coil 11*b*. Circuit terminals 27*g* are to be connected to a smoothing condenser 19. Circuit terminals 27*h* are to be connected to common mode coil 11*a*. FIG. 37A is a side view for showing a control substrate. FIG. 37B is a pattern diagram of a control substrate viewed from a front side of the control substrate. The circuit terminals 27*f* are provided for connecting with the normal mode coil 11*b* and pass through the through holes 13*f*. The circuit terminals 27*g* are provided for connecting with the smoothing condenser 19 and pass through the through holes 13*g*. The circuit terminals 27*h* are provided for connecting with the common mode coil 11*a* and pass through the through holes 13*h*. Each of the circuit terminals 27*b* passes through a respective through hole 13*e* and extends to the rear side of the control substrate 13. The smoothing condenser 19 and the noise reduction coils 11 are connected to the plurality of the circuit terminals 27*b*.

Embodiment 17.

Figure 38:
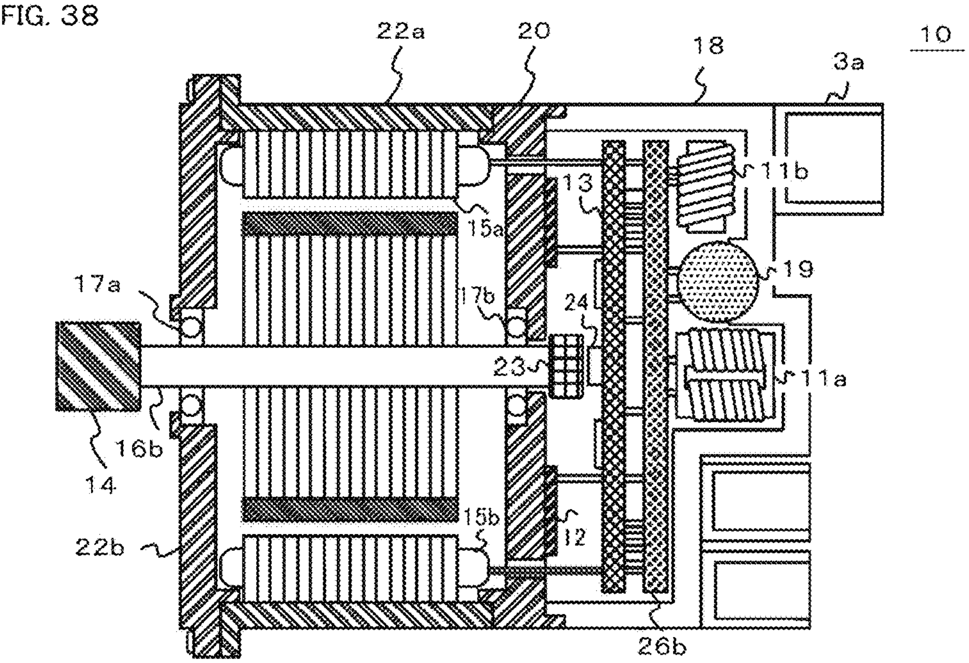
FIG. 38 is an illustrative drawing for showing a rotating electric machine in accordance with Embodiment 17.

FIG. 38 is an illustrative drawing of the rotating electric machine in accordance with Embodiment 17 of the present invention. A circuit wiring member 26*b* is arranged at a position far rear side of a heat sink 20 and a control substrate 13. The circuit wiring member 26*b* is electrically connected to bus bars 26*c*, a common coil 11*a*, a normal mode coil 11*b*, a smoothing condenser 19, power terminals 27*a*, circuit terminals (input terminals) 27*b* and others by welding, press fitting, soldering or the like. On the far rear side of a position where a bearing 17*b* is inserted, there is arranged the circuit wiring member 26*b* which is loaded with noise reduction coils 11 and a smoothing condenser 19. Failures can be prevented in the rotating electric machine to occur, when those components fall into the inside of the rotating electric machine. A circuit wiring member is not arranged between the switching elements 12 and the control substrate 13. Accordingly, the heat sink secures a volume per shaft length. In addition to that, the heat sink is improved in heat capacity, though the heat sink has a smaller size in shaft direction. Moreover, a circuit wiring member is not arranged between the rear side bearing 17*b* and the control substrate 13. Thereby the distance between the rear side bearing 17*b* and the control substrate 13 becomes smaller. In consequence, the rotating electric machine 10 becomes small in size, and moreover, the rotating electric machine 10 can be reduced in weight. A plurality of circuit terminals 27*b* extend to the circuit wiring member 26*b* and are connected to the smoothing condenser 19 and the noise reduction coils 11.

A permanent magnet of sensor use 23 is attached directly to the rear side end portion of a rotor shaft 16. The permanent magnet of sensor use 23 protrudes towards a rear side direction from the heat sink 20. The rotor shaft 16 is decreased in length of the shaft direction. Accordingly, the rotating electric machine can be reduced in size and weight. Moreover, the permanent magnet of sensor use 23 produces a smaller eccentric error to the rotary sensor 24. In addition, because at least one of the noise reduction coils 11 and the smoothing condenser 19 fails to be arranged between the rear side bearing 17*b* and the control substrate 13, the distance between the rear side bearing 17*b* and the control substrate 13 becomes smaller. In consequence, the rotating electric machine 10 can have a smaller size in the shaft direction and, moreover, becomes lighter in weight.

The smoothing condenser 19 performs heat radiation and cooling, by putting the surrounding of the condenser in direct contact or indirect contact through a plastic and the like with a control device case 18. Accordingly, the rise in temperature of the smoothing condenser 19 is suppressed and the smoothing condenser 19 is improved in reliability. When the control device case 18 is made of metal like aluminum or others, the smoothing condenser 19 is in contact with a metal member of high thermal conductivity. The smoothing condenser 19 can release more heat to the periphery of the rotating electric machine. Accordingly, the rise in temperature of the smoothing condenser 19 is suppressed further and the smoothing condenser 19 is improved in reliability. Failures occur in a smoothing condenser 19, when the smoothing condenser becomes high in temperature. It is necessary to reduce current for feeding to the rotating electric machine, in order to prevent failures to occur. The reduction in current leads to the decrease in torque of the rotating electric machine. By putting the control device case and the smoothing condenser in contact with each other, rise in temperature of the smoothing condenser is suppressed and the reduction in torque of the rotating electric machine is further suppressed. It is obvious that the smoothing condenser may be arranged in plural, for example, three in number. The rotating electric machine accepts the configuration in which smoothing condensers, more than four in number, are arranged. The smoothing condensers have improved heat capacity and the rise in temperature of the smoothing condenser can be further suppressed. Accordingly, the smoothing condensers are improved further in reliability and the reduction in torque of the rotating electric machine is further suppressed.

Embodiment 18.

Figure 39:
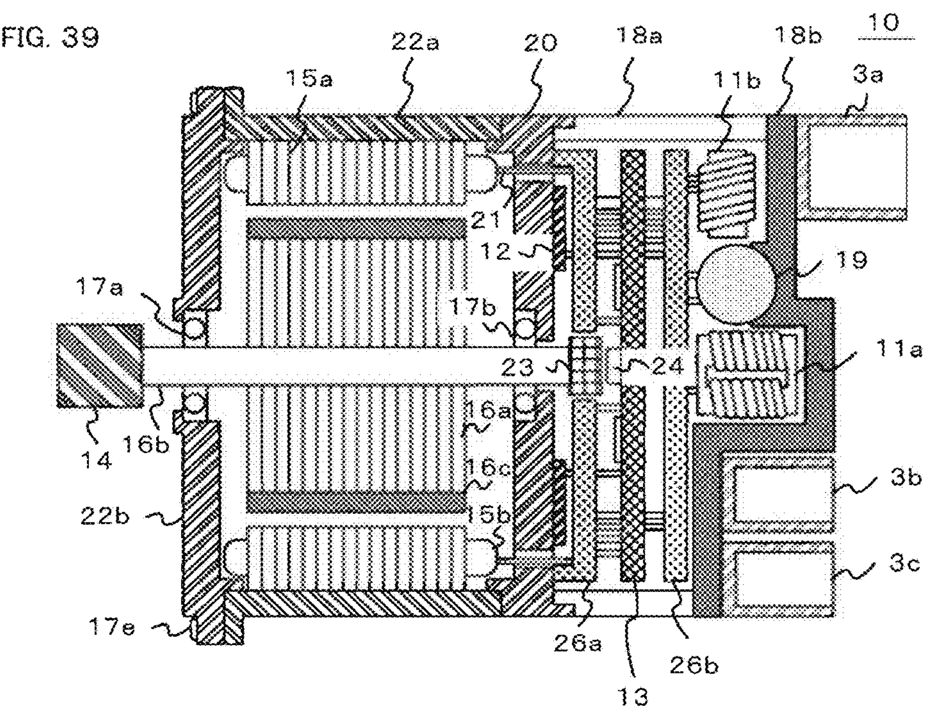
FIG. 39 is a schematic drawing for showing a rotating electric machine in accordance with Embodiment 18.

FIG. 39 is an illustrative drawing of the rotating electric machine in accordance with Embodiment 18 of the present invention. A smoothing condenser 19A is in contact with a control device case, and only a part of the case body may be made of metal, like aluminum and others. In the embodiment, as shown in the drawing, the control device case 18 consists of a case portion 18*a* (a first case portion) which is composed of insulation material having a low thermal conductivity and is connected with the heat sink 20, and a case portion 18*b* (a second case portion) which is composed of metal like aluminum and others. The smoothing condenser is in contact with the case portion 18*b*. Heat transfer rate between the heat sink 20 and the case portion 18*b* is lowered and then, heat flow from the heat sink 20 to the control device case 18 can be reduced. Accordingly, the smoothing condenser 19 can be restrained in rise of temperature. The smoothing condenser can have further improved reliability and the torque of the rotating electric machine can be prevented further from lowering.

The smoothing condenser 19 as well as the noise reduction coils 11 is arranged at a position far rear side of the control substrate 13. It is obvious that the embodiment accepts a configuration in which at least one of the smoothing condenser 19 and the noise reduction coils 11 are arranged on the rear side of the control substrate 13. When both of the smoothing condenser 19 and the noise reduction coils 11 are arranged on the rear side of the control substrate 13, it is possible to avoid arranging the smoothing condenser 19 and the noise reduction coils 11 inside the heat sink 20. The heat sink secures a more volume per shaft length. In addition, the heat sink is improved in heat capacity, while the heat sink has a further reduced size in length of the shaft direction.

The distance between a rear side bearing 17*b* and a control substrate 13 becomes smaller, because the smoothing condenser 19 and the noise reduction coils 11 are not arranged between the rear side bearing 17*b* and the control substrate 13. In consequence, the size of the rotating electric machine is reduced in the shaft direction and the rotating electric machine becomes further light in weight. The rotor shaft 16*b* has a shorter length in the shaft direction, and then, the rotating electric machine can be reduced in size and weight. In addition, the permanent magnet of sensor use 23 can produce a smaller eccentric error to the rotary sensor 24.

An armature winding 15*b*, switching elements 12 and others of the rotating electric machine 10 produce heat when current is fed into them. The heat sink 20 is in contact with the switching elements 12 and absorbs the heat produced. The armature winding 15*b*, the switching elements 12 and the heat sink 20 increase the temperature of the nearby smoothing condenser 19 and the noise reduction coils 11. Therefore, from the standpoint of preventing the failures of the smoothing condenser, the noise reduction coils and the like to occur, it is necessary to reduce the current fed into the rotating electric machine. The rise in temperature decreases the torque of the rotating electric machine, and further, lowers the reliability of the smoothing condenser 19. By adopting a configuration in which the smoothing condenser as well as the noise reduction coils is arranged on the rear side of the control substrate, the smoothing condenser and the noise reduction coils are disposed in a location away from the armature winding, the switching elements, the heat sink and others of the rotating electric machine. Accordingly, the smoothing condenser and the noise reduction coils can be suppressed in temperature rise.

The control substrate 13 and the circuit wiring member 26 are interposed between the smoothing condenser, the noise reduction coils and the armature winding, the switching elements, the heat sink. The control substrate 13, the circuit wiring member 26 and others have a heat insulating effect, and thereby the smoothing condenser and the noise reduction coils can be suppressed in temperature rise. As mentioned above, such effects are produced that the rotating electric machine can hold on the reduction in torque, or the smoothing condenser is improved in reliability and the like. A conductive polymer hybrid aluminum electrolytic capacitor can be arranged and employed as a smoothing condenser. Although the hybrid type condenser is small in heat capacity, it is smaller in size compared with electrolytic capacitors and others. As the smoothing condenser is lowered in temperature rise, the rotating electric machine can be made smaller in size, by employing the hybrid type condenser as a smoothing condenser.

Embodiment 19.

Figure 40:
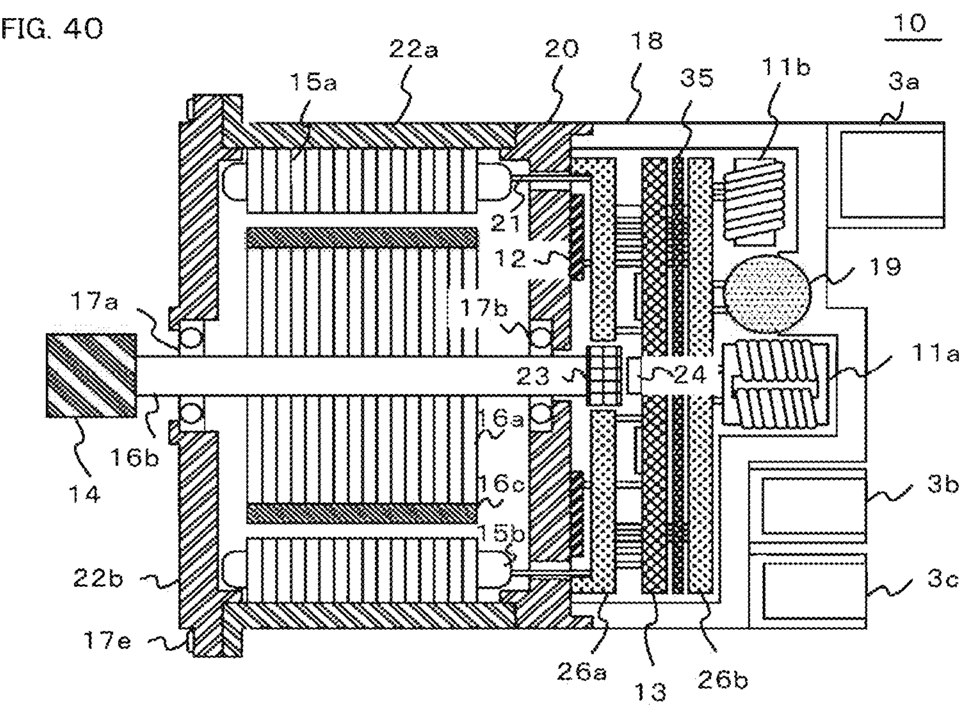
FIG. 40 is a schematic drawing for showing a rotating electric machine in accordance with Embodiment 19.

FIG. 40 is an illustrative drawing of the rotating electric machine in accordance with Embodiment 19 of the present invention. The structure of the rotating electric machine is basically the same as that of Embodiment 1. The smoothing condenser 19 as well as the noise reduction coils 11 is arranged on the rear side of the control substrate 13. The armature winding 15*b* and the switching elements 12 of the rotating electric machine 10 generate heat when current is fed into them. The heat sink 20 is in contact with the switching elements 12 and then, absorbs heat produced. According to the present embodiment, a plate like insulation member 35 is arranged between the control substrate 13 and the circuit wiring member 26*b*, in such a manner that the insulation member is set almost in parallel to the control substrate 13. The armature winding 15*b*, the switching elements 12, the heat sink 20 and others increase the temperature of the nearby smoothing condenser 19 and the noise reduction coils 11. Therefore, from the standpoint of preventing the malfunction of the smoothing condenser and the noise reduction coils, it is necessary to reduce the current fed into the rotating electric machine. The rise in temperature decreases the torque of the rotating electric machine. Further, the reliability of the smoothing condenser 19 is lowered.

According to the present embodiment, the smoothing condenser 19 and the noise reduction coils 11 are both disposed on a circuit wiring member 26*b* that is arranged on the rear side of the control substrate 13. An insulation member 35 is arranged between the control substrate 13 and the circuit wiring member 26*b*, in such a manner that the insulation member is set almost in parallel to the control substrate 13. Heat transferred from the armature winding 15*b*, the switching elements 12, the heat sink 20 and others to the smoothing condenser 19 and the noise reduction coils 11 is lowered. In consequence, the smoothing condenser 19 and the noise reduction coils 11 are suppressed in the rise of temperature. Further, the reduction of torque is suppressed in the rotating electric machine and the reliability of the smoothing condenser 19 can be improved. The insulation member 35 is arranged between the circuit wiring member 26*b* and the control substrate 13, in such a manner that the insulation member is set almost in parallel to the control substrate 13. Accordingly, the rotating electric machine has non larger size in the shaft direction. The reduction of torque is suppressed in the rotating electric machine and the reliability of the smoothing condenser can be improved.

Embodiment 20.

Figure 41:
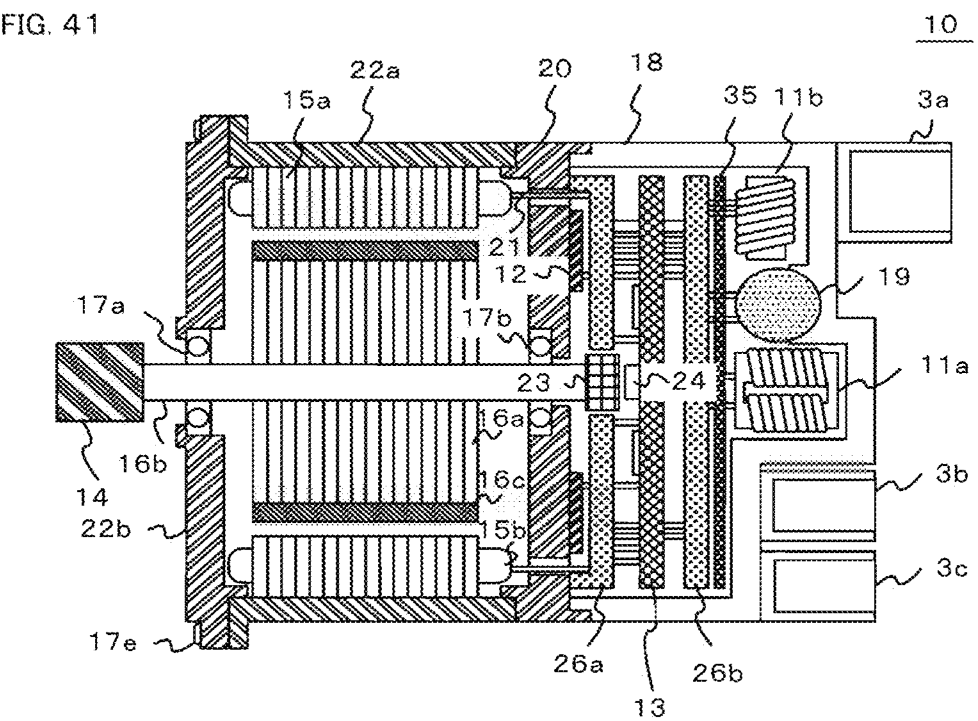
FIG. 41 is a schematic drawing for showing a rotating electric machine in accordance with Embodiment 20.

FIG. 41 is an illustrative drawing of the rotating electric machine in accordance with Embodiment 20 of the present invention. In the previous embodiment, an insulation member 35 is provided between the control substrate 13 and the circuit wiring member 26*b*. According to the present embodiment, as shown in the drawing, a plate like insulation member 35 is provided at a position far rear side of the circuit wiring member 26*b*. The insulation member 35 is provided at the leg room of the smoothing condenser 19 and the noise reduction coils 11, and then, similar effects like those of the previous embodiments are produced.

The insulation member 35 may be in contact with the circuit wiring member 26*b*. An insulation portion mounted on the control substrate 13 or the circuit wiring member 26*b* can be employed as an insulation member 35. Such advantageous effects are produced that the components are reduced in number or by decreasing a space in the shaft direction, the rotating electric machine is reduced in size of the shaft direction and the like. It is obvious that similar effects are produced, when an insulation portion is arranged, almost in parallel to the control substrate, between the control substrate and the smoothing condenser/the noise reduction coils, even in a case where the insulation portion is in a different size or at a different position.

Embodiment 21.

Figure 42:
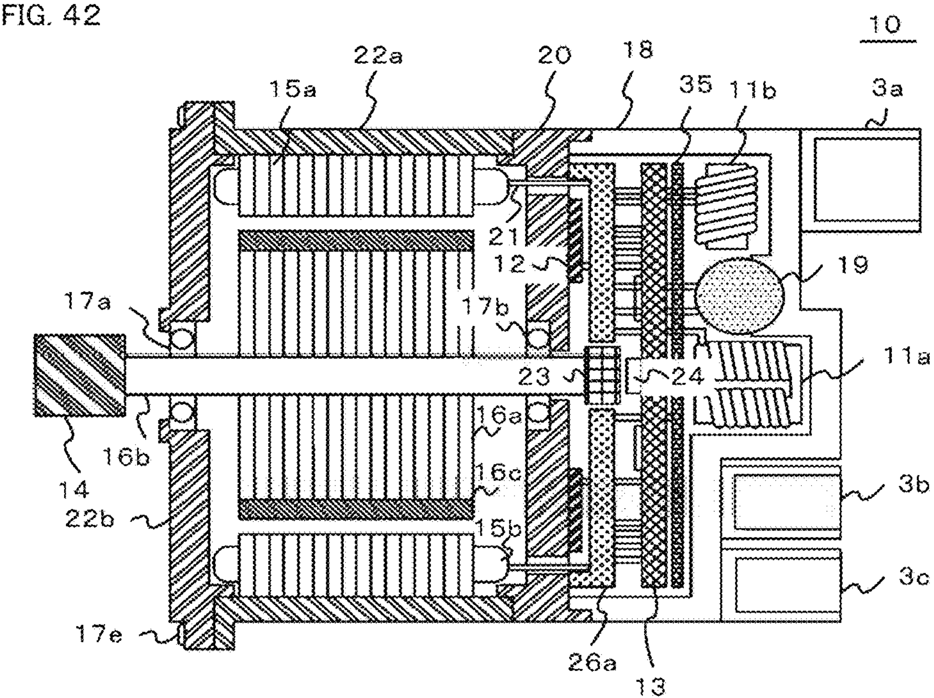
FIG. 42 is a schematic drawing for showing a rotating electric machine in accordance with Embodiment 21.

FIG. 42 is an illustrative drawing of the rotating electric machine in accordance with Embodiment 21 of the present invention. In the present embodiment, a configuration is provided in which a plate like insulation member 35 is disposed between the control substrate 13 and the smoothing condenser/the noise reduction coils. Accordingly, it is obvious that the embodiment produces similar effects. The circuit wiring member 26*a* constitutes a member which is arranged at a position far rear side of the heat sink 20 and, furthermore, at a position far front side of the control substrate 13.

The insulation member 35 may be in contact with the control substrate 13. An insulation portion mounted on the control substrate 13 or the circuit wiring member 26*a* can be employed as an insulation member 35. Such advantageous effects are produced that components are reduced in number or the rotating electric machine is, by decreasing a space in the shaft direction, reduced in size of the shaft direction and the like. It is obvious that similar effects are produced, when an insulation portion is arranged between the control substrate and the smoothing condenser/the noise reduction coils, in such a manner that the insulation portion is set almost in parallel to the control substrate, even in a case where the insulation portion is in a different size or at a different position.

Embodiment 22.

Figure 43:
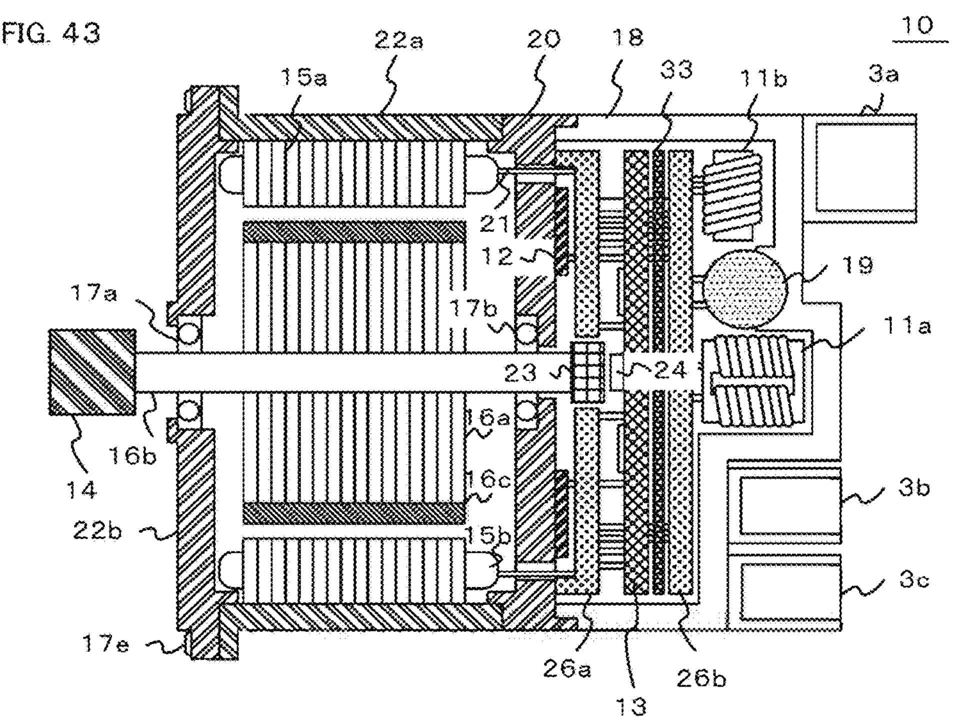
FIG. 43 is a schematic drawing for showing a rotating electric machine in accordance with Embodiment 22.

FIG. 43 is an illustrative drawing of the rotating electric machine in accordance with Embodiment 22 of the present invention. The structure of the rotating electric machine is basically the same as that of Embodiment 1. A smoothing condenser 19 and noise reduction coils 11 are both arranged on the rear side of the control substrate 13. In the present embodiment, a plate like noise shielding member 33 is provided, almost in parallel to the control substrate 13, between the control substrate 13 and the circuit wiring member 26*b*. The smoothing condenser 19 and the noise reduction coils 11 are fed with current and thereby generate magnetic noises in the circumstances thereof. Magnetic fluxes interlinkage with a nearby rotary sensor 24 and the angular error of the rotary sensor 24 increases. Moreover, the magnetic fluxes interlinkage with the control substrate 13 and make a control device function falsely. Under those circumstances, the rotating electric machine generates vibrations and noises in larger quantity. The noise shielding member 33 can employ a metal plate, for example.

The smoothing condenser 19 and the noise reduction coils 11 are both disposed on a circuit wiring member 26*b*. The circuit wiring member 26*b* is arranged on the rear side of the control substrate 13. In addition, a noise shielding member 33 is arranged between the control substrate 13 and the circuit wiring member 26*b*, in such a way that the noise shielding member 33 is set almost in parallel to the control substrate 13. Accordingly, magnetic fluxes, from the smoothing condenser 19 and the noise reduction coils 11, interlinkage in a smaller quantity with the rotary sensor 24, the control substrate 13 and others. Such effects are thereby produced that the angular error of the rotary sensor 24 decreases, unwanted operations are prevented in the rotating electric machine, vibrations and noises of the rotating electric machine are generated at a reduced level and the like. Further, the noise shielding member 33 is arranged between the control substrate 13 and the circuit wiring member 26*b*, in such a way that the noise shielding member 33 is set in parallel to the control substrate 13. The angular error of the rotary sensor 24 can be decreased, while the rotating electric machine is kept at no larger size in the shaft direction. Accordingly, the unwanted operations of the control device are prevented and the vibrations and noises of the rotating electric machine are reduced.

Embodiment 23.

Figure 44:
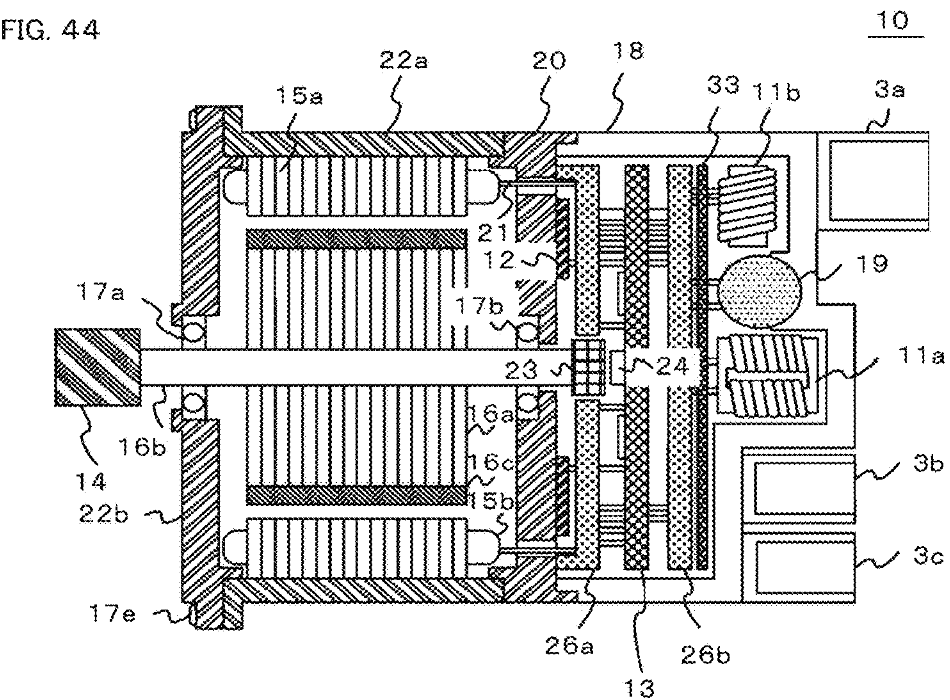
FIG. 44 is a schematic drawing for showing a rotating electric machine in accordance with Embodiment 23.

FIG. 44 is an illustrative drawing of the rotating electric machine in accordance with Embodiment 23 of the present invention. In the previous embodiment, the noise shielding member 33 is arranged between the control substrate 13 and the circuit wiring member 26*b*. As shown in the drawing, it is obvious that similar effects are produced when the noise shielding member 33 is provided on the rear side of the circuit wiring member 26*b*. The noise shielding member 33 may be in contact with the control substrate 13 or the circuit wiring member 26*b*. Further, the noise shielding member 33 can employ a member for noise shielding which is provided on the control substrate 13 or the circuit wiring member 26*b*. Such effects are produced that components are reduced in number, the size of the rotating electric machine is reduced in the shaft direction and the like.

Embodiment 24.

Figure 45:
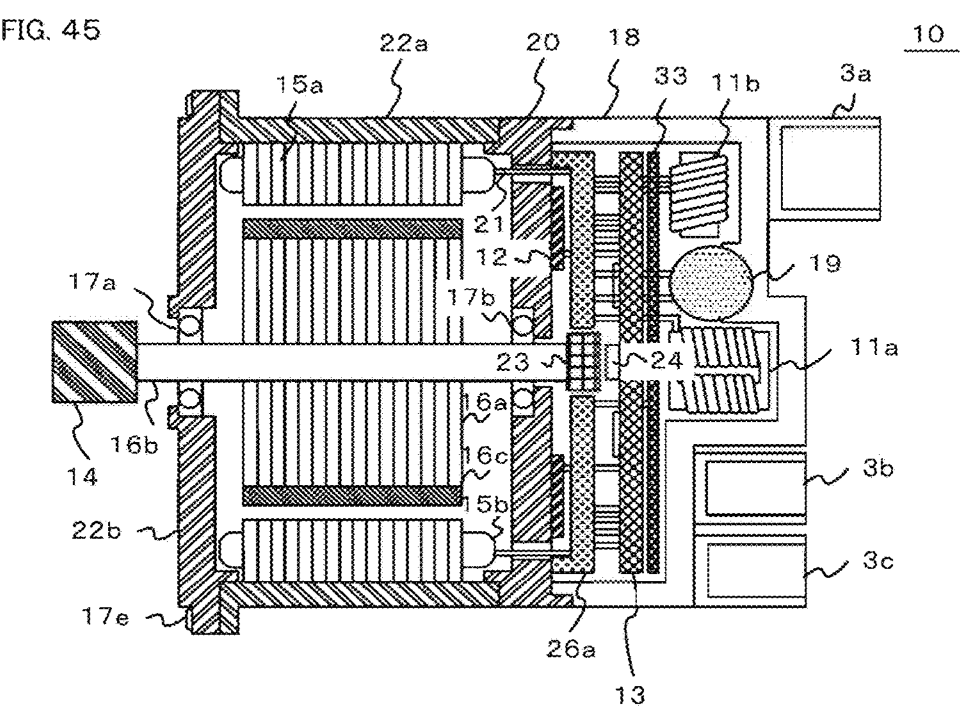
FIG. 45 is a schematic drawing for showing a rotating electric machine in accordance with Embodiment 24.

FIG. 45 is an illustrative drawing of the rotating electric machine in accordance with Embodiment 24 of the present invention. It is obvious that similar effects are produced, by taking a configuration that the noise shielding member 33 is arranged between the control substrate 13 and the smoothing condenser 19/the noise reduction coils 11. As shown in the drawing, the circuit wiring member 26*a* constitutes a member which is arranged at a position far rear side of the heat sink 20 and, further, at a location far front side of the control substrate 13. Similar effects are produced, when a noise shielding member is arranged between the control substrate 13 and the smoothing condenser 19/the noise reduction coils 11, in such a manner that the noise shielding member is set almost in parallel to the control substrate, even in a case where the noise shielding member is in a different size or at a different position.

Embodiment 25.

Figure 46:
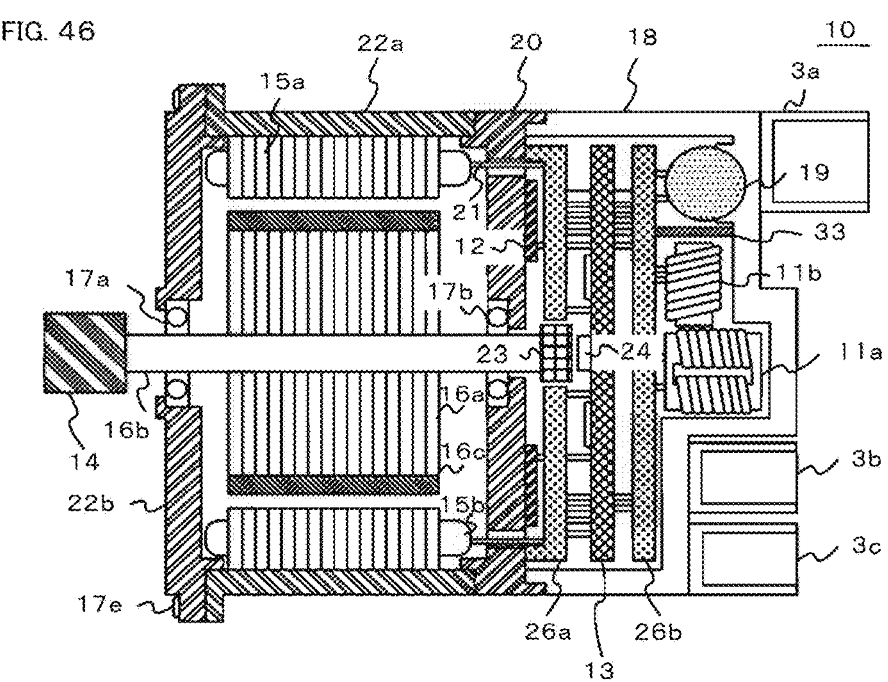
FIG. 46 is a schematic drawing for showing a rotating electric machine in accordance with Embodiment 25.

FIG. 46 is an illustrative drawing of the rotating electric machine in accordance with Embodiment 25 of the present invention. The structure of the rotating electric machine is basically the same as that of Embodiment 1. A smoothing condenser 19 and noise reduction coils 11 are both arranged on the rear side of the control substrate 13 as well as the circuit wiring member 26*b* here. In the circumference of the noise reduction coils 11, arranged is a noise shielding member 33. Magnetic coupling between a smoothing condenser 19 and a normal mode coil 11*b* is generated, when the smoothing condenser 19 and the noise reduction coils 11 are all arranged on the rear side of the control substrate 13. In the present embodiment, between the smoothing condenser 19 and the normal mode condenser 11*b*, inserted is a noise shielding member 33. By the arrangement of the noise shielding member 33, magnetic coupling of the closely arranged smoothing condenser 19 and normal mode coil 11*b* can be decreased. In consequence, unwanted operations of the rotating electric machine are prevented, and the rotating electric machine drives in a smoothing way and generates vibrations and noises at a reduced level.

In the present embodiment, the noise reduction coils 11 and the smoothing condenser 19 are supposed to be arranged on the rear side of the control substrate 13. It is obvious that similar effects are produced, when at least one of the noise reduction coils 11 and the smoothing condenser 19 is arranged on the rear side of the control substrate 13. Further, here is provided a case where the noise shielding member 33 is inserted between the smoothing condenser 19 and the normal mode condenser 11*b*. Similar effects are produced, even in a case where a noise shielding member 33 is inserted between a smoothing condenser 19 and a common mode condenser 11*a*. Magnetic coupling can be reduced between the smoothing condenser 19 and the common mode coil 11*a*, which are arranged closely.

Note that, in the present invention, the embodiments each can be freely combined, and/or each of the embodiments can be appropriately modified or eliminated without departing from the scope of the invention.

DENOTATION OF REFERENCE NUMERALS

1*a* steering wheel; 1*b* steering shaft; 1*c* shaft; 2 torque sensor; 3*a* connector; 3*b* connector; 3*c* connector; 4 control device; 5 motor unit; 6 gear box; 7 rack housing; 7*a* rack shaft; 8 tie rod; 9 rack boot; 10 rotating electric machine; 11 noise reduction coil; 11*a* common mode coil; 11*b* normal mode coil; 12 switching element; 12*d* shunt resistor; 12*m* switching element; 12*s* DBC substrate; 12*t* terminal; 13 control substrate; 13*a* microcomputer; 13*b* FET driving circuit; 13*c* positioning portion; 13*d* through hole; 13*e* through hole; 13*f* through hole; 13*g* through hole; 13*h* through hole; 14 pulley; 15 stator; 15*a* stator core; 15*b* armature winding; 16 rotor; 16*a* rotor core; 16*b* rotor shaft; 16*c* permanent magnet; 16*d* shaft holding portion; 16*g* rotor core concave portion; 16*h* shaft holding jig; 17*a* bearing; 17*b* bearing; 17*e* bolt; 18 control device case; 19 smoothing condenser; 20 heat sink; 20*a* heat sink protrusion portion; 20*b* shaft through hole; 20*c* switching element arrangement portion; 20*d* electric wiring through hole; 20*e* rear side protrusion portion; 20*f* insulation member; 20*g* front side protrusion portion; 20*h* switching element arrangement portion; 20*i* ring like front side concave portion; 20*j* rear side concave portion; 20*k* protrusion portion; 21 motor terminal; 22*a* motor frame; 22*b* front side housing; 22*d* shaft through hole; 23 permanent magnet of sensor use; 24 rotary sensor; 25 connection plate; 26 circuit wiring member; 26*a* circuit wiring member; 26*b* circuit wiring member; 26*c* bus bar; 26*d* frame; 26*e* positioning portion; 27*a* power terminal; 27*b* circuit terminal; 27*f* circuit terminal; 27*g* circuit terminal; 27*h* circuit terminal; 30 power relay; 31 battery; 33 noise shielding member; 34 rear side housing; 35 insulation member; 100 electric power assist steering system

What is claimed is:

1. A rotating electric machine with a built-in control device, the machine comprising:

- a rotor including a permanent magnet of sensor use, the magnet attached to a rear side of a rotor shaft;
- a stator including a stator core and an armature winding, the armature winding connected to a plurality of motor terminals;
- a front side housing fixed with a first bearing, the bearing supporting a front side of the rotor shaft;
- a motor frame coupled with the front side housing, the frame containing the rotor and the stator;
- a heat sink fixed with a second bearing supporting a rear side of the rotor shaft, formed of a first through hole through which the motor terminals pass and mounting a plurality of switching elements;
- a control substrate arranged at a position far rear side of the heat sink, and mounting a rotary sensor, a microcomputer, and a driving circuit;
- a smoothing condenser connected to the plurality of switching elements;
- a noise reduction coil connected to the plurality of switching elements; and
- a first circuit wiring member arranged at a position far rear side of the control substrate and mounting the smoothing condenser and the noise reduction coil;

wherein the rotary sensor faces with the permanent magnet of sensor use, the microcomputer controls the driving circuit based on a signal from the rotary sensor and drives the plurality of switching elements.

2. The rotating electric machine with a built-in control device, as set forth in claim 1, further comprising:

- a second circuit wiring member arranged at a position at a far rear side of the heat sink, mounting a plurality of circuit terminals and including a second through hole on center through which the rotor shaft passes;

wherein the control substrate includes a plurality of third through holes and arranged at a position at a far rear side of the second circuit wiring member, each of the plurality of circuit terminals passes through a third through hole, extends to the first circuit wiring member and is connected with the smoothing condenser and the noise reduction coil.

3. The rotating electric machine with a built-in control device, as set forth in claim 1, wherein the control substrate includes a plurality of circuit terminals mounted thereon, and the plurality of circuit terminals extends to the first circuit wiring member and are connected with the smoothing condenser and the noise reduction coil.

4. The rotating electric machine with a built-in control device, as set forth in claim 1, wherein the heat sink is press fitted with the motor frame.

5. The rotating electric machine with a built-in control device, as set forth in claim 2, further comprising a ring like connection plate which serves as a wiring between the plurality of motor terminals and the second circuit wiring member.

6. The rotating electric machine with a built-in control device, as set forth in claim 2, wherein the plurality of switching elements are in close contact with the second circuit wiring member.

7. The rotating electric machine with a built-in control device, as set forth in claim 1, wherein the motor frame is integrated with the front side housing.

8. The rotating electric machine with a built-in control device, as set forth in claim 1, wherein the motor frame is integrated with the heat sink.

9. The rotating electric machine with a built-in control device, as set forth in claim 1, further comprising a noise shielding member is provided in a periphery of the noise reduction coil.

10. The rotating electric machine with a built-in control device, as set forth in claim 1, wherein the motor frame and the heat sink are made of a same metal material.

11. The rotating electric machine with a built-in control device, as set forth in claim 1, wherein an outer diameter of the permanent magnet of sensor use is larger than an outer diameter of the rotor shaft.

12. The rotating electric machine with a built-in control device, as set forth in claim 1, further comprising a control device case containing the control substrate and the first circuit wiring member, wherein the control device case includes an insulative first case portion connected to the heat sink and a metal second case portion arranged at a position far rear side of the first case portion, and the smoothing condenser is in contact with the second case portion.

13. The rotating electric machine with a built-in control device, as set forth in claim 2, further comprising an insulation portion or a noise shielding member which is arranged between the control substrate and the first circuit wiring member.

14. The rotating electric machine with a built-in control device, as set forth in claim 2, further comprising an insulation portion or a noise shielding member which is arranged at a position far rear side of the first circuit wiring member.

15. The rotating electric machine with a built-in control device, as set forth in claim 1, further comprising a noise shielding member arranged between the smoothing condenser and the noise reduction coil.

16. An electric power assist steering system comprising:

a steering shaft connected to a steering wheel;

a rotating electric machine with a built-in control device, as set forth in claim 1;

a gear box decreasing rotational torque generated in the rotating electric machine with a built-in control device; and a torque sensor detecting torque transmitted to the steering shaft;

wherein a signal detected by the torque sensor is entered into the rotating electric machine with a built-in control device.

* * * * *